(12) United States Patent
Vega

(10) Patent No.: US 7,272,575 B2
(45) Date of Patent: Sep. 18, 2007

(54) METHOD AND SYSTEM FOR FACILITATING SERVICE TRANSACTIONS

(76) Inventor: Lilly Mae Vega, 834 Avenue F, Fort Madison, IA (US) 52627

( * ) Notice: Subject to any disclaimer, the term of this patent is extended or adjusted under 35 U.S.C. 154(b) by 958 days.

(21) Appl. No.: 09/903,985

(22) Filed: Jul. 13, 2001

(65) Prior Publication Data

US 2002/0069079 A1    Jun. 6, 2002

(51) Int. Cl.
*G06F 17/30* (2006.01)

(52) U.S. Cl. .............. 705/27; 705/26; 705/37; 705/80; 705/39; 705/1; 348/5; 348/7; 707/10; 707/100

(58) Field of Classification Search .......... 705/26, 705/37, 27, 80, 39, 53, 35, 40, 28, 1, 2, 57, 705/14; 379/93.12; 283/67; 348/5, 7; 707/10, 707/100
See application file for complete search history.

(56) References Cited

U.S. PATENT DOCUMENTS

| | | | | |
|---|---|---|---|---|
| 5,630,070 | A * | 5/1997 | Dietrich et al. ............... | 705/8 |
| 5,835,896 | A * | 11/1998 | Fisher et al. ................ | 705/37 |
| 5,966,699 | A * | 10/1999 | Zandi ........................ | 705/38 |
| 6,012,045 | A * | 1/2000 | Barzilai et al. .............. | 705/37 |
| 6,041,267 | A * | 3/2000 | Dangat et al. ............... | 700/107 |
| 6,049,742 | A * | 4/2000 | Milne et al. ................. | 700/99 |
| 6,199,050 | B1 * | 3/2001 | Alaia et al. ................. | 705/37 |
| 6,216,114 | B1 * | 4/2001 | Alaia et al. ................. | 705/37 |
| 6,223,167 | B1 * | 4/2001 | Alaia et al. ................. | 705/37 |
| 6,230,146 | B1 * | 5/2001 | Alaia et al. ................. | 705/37 |
| 6,230,147 | B1 * | 5/2001 | Alaia et al. ................. | 705/37 |
| 6,449,601 | B1 * | 9/2002 | Friedland et al. ............ | 705/37 |
| 2001/0032173 | A1 * | 10/2001 | Alaia et al. ................. | 705/37 |
| 2002/0026403 | A1 * | 2/2002 | Tambay et al. .............. | 705/37 |

OTHER PUBLICATIONS www.monster.com.*
www.guru.com.*
Guru.com: The world's largest market place for freelance talent (www.guru.com).*
Monster for employers; SmartFind Resume search (www.hiring.monster.com/resumesearch).*

* cited by examiner

*Primary Examiner*—Andrew J. Fischer
*Assistant Examiner*—Cristina Owen Sherr
(74) *Attorney, Agent, or Firm*—McKee, Voorhees & Sease, P.L.C.

(57) ABSTRACT

A computer-implemented method and system for facilitating service transactions, both on-line and off-line, for transacting services driven by purchasers or by service providers. In particular, the invention makes services freely tradable as goods via standardizing material terms describing such service transactions. The method includes steps defining a set of service classification and material terms, registering a plurality of participants of the service marketplace, searching and compiling at least one offer and one request for offers provided by the participants for selling or buying services while the offer and the request for offer is described in the set of service classification and material terms, evaluating and matching the offer and the request for offer based upon the degree of identicalness of the set of service classification and material terms recited in the offer and the request for offer, and communicating to matched participants of the result generated by the evaluating and matching step.

58 Claims, 6 Drawing Sheets

METHOD AND SYSTEM FOR FACILITATING SERVICE TRANSACTIONS

BACKGROUND OF THE INVENTION

1. Field of the Invention

The invention generally relates to a method and system for facilitating service transactions between service providers and purchasers for services, and more particularly to a computer-implemented method/system that provides a service marketplace, both on-line and off-line, for transacting services driven by purchasers or by the service providers. In particular, the invention makes services freely tradable as goods via a set of standardizing material terms describing such service transactions.

2. Description of Related Arts

A variety of service transaction promoting systems have been developed for promoting the transactions of services either on-line or off-line. The following sites are examples of attempts to transact services on-line known at the time of filing the application. Applicant is not aware of when such systems may have become known to the public relative to the time of conception and/or reduction to practice of the invention. While many companies have attempted to transact services on the Internet, none of them provides a solution to freely trade services as goods, stocks or commodities. For example, ServiceMagic.com assists a purchaser to search via a list of pre-screened home maintenance service professionals selected by an interested purchaser. It is limited to home maintenance services, and its pre-screening procedure only ensures the providers are licensed by the state, have not filed bankruptcy within the past seven years, and have no liens or judgments against them within the past three years. The site rather passively provides the information without going forward to compare or match any transaction. None of these searches results in any forms of binding transactions of services. In other words, ServiceMagic.com is merely a volume of on-line maintenance service yellow pages.

Elance.com intends to connect buyers with freelancers or independent contractors electronically but having a few shortcomings. Firstly, the e-lanced services are limited to the traditional freelancing services, such as writing, designing and translation, and conventional professional services, such as legal and accounting services. Secondly, the buyers have to browse respective profiles of each service provider so as to invite them to bid. Alternatively, the buyers wait for service providers to submit proposals including estimate and explanations responsive to the buyers' projects. Then the buyers "handpick" a bid-winner. Although Elance.com is implemented on-line, its automation is limited to recording and posting offers. As such, the number and length of the proposals is significantly limited by the capability of the human brain for processing multiple variables of multiple proposals. Thirdly, Elance.com does not provide actual bidding or auctions since whatever being proposed is not final and binding on the buyers. Rather, the buyers are free to disregard all the proposals or arbitrarily decide a winner after a posting section is closed. The alleged bidding process is not an actual bid but rather a one-sided (pro-buyer) transactional forum.

Fourthly, in its default procedure, Elance.com certifies the buyers' ability to pay via credit cards or debit cards but does not certify any service providers' credentials or ability to carry out the services. Fifthly, Elance.com collects the feedback from participants to establish cumulative ratings of other chosen participants, but it does not verify the comments. Just like any classified advertisements in newspapers, the service providers may post whatever they would like on Elance.com, and Elance.com is not responsible for the contents other than the credit card information.

According to CNET News, a handful of software companies are seeking to automate management of legal contracts and agreements for tracking contract terms and conditions, which is still an abstract idea, and the idea is limited to internal contract management.

Currently, there is no neutral platform facilitating service transactions between purchasers and service providers via automatically and simultaneously comparing multiple service proposals with multiple variables.

SUMMARY OF THE INVENTION

It is a purpose of this invention to foster global service transactions by automatically collecting and compiling viable offers for a purchaser regardless of geographical location so buyers can thereby compare competing offers on-line in real time based upon a set of material terms.

It is a purpose of this invention to allow a participant of the service marketplace to leverage the market forces of supply and demand and to dynamically reduce costs of operation.

It is a purpose of this invention to provide "total cost functionality" which enables a participant to make business decisions based not only on price, but also on multiple criteria such as quality, delivery time and referral based.

It is a purpose of this invention to provide an integrated management tool to shorten transaction and fulfillment cycles, reduce inventory and administrative costs, and reliably fulfill service contracts.

It is a purpose of this invention to provide a method for marketing to targeted customers with focused content so as to create sales.

It is another purpose of this invention to provide a complete and sophisticated prediction, simulation and optimization decision-making platform for participants of the service marketplace.

It is another purpose of this invention to mine customer data not previously available.

It is another purpose of this invention to certify credits and credentials of any participants of the service marketplace.

It is another purpose of this invention to collect feedback about the quality and value of services based on price and buyers' evaluations.

It is another purpose of this invention to reduce manual analysis and data consolidation.

It is another purpose of this invention to improve decision-making assistance for business strategic planning.

It is another purpose of this invention to improve inventory and distribution channel management.

It is another purpose of this invention to improve monitoring of business initiatives.

It is another purpose of this invention to identify and recapture lost revenue.

It is another purpose of this invention to offer strategic decision-making solutions that will help a participant of the service marketplace to coordinate services and make the optimal decision at each critical decision point.

It is another purpose of this invention to enable managers with different functional responsibility to make decisions consistent with overall long-term company success by utilizing a lifetime consumption value of services (LCVS).

It is still another purpose of this invention to recognize the speech, language, emotion, social intelligence, character and characteristics of a participant so as to improve the communication and interaction in the service marketplace.

It is still another purpose of this invention to provide three-dimensional or holographic videoconferencing to provide a real sense of live participation and the opportunity of observing the counterpart's facial expression and body language as if talking face-to-face.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DESCRIPTION OF THE PREFERRED EMBODIMENTS

Figure 1:
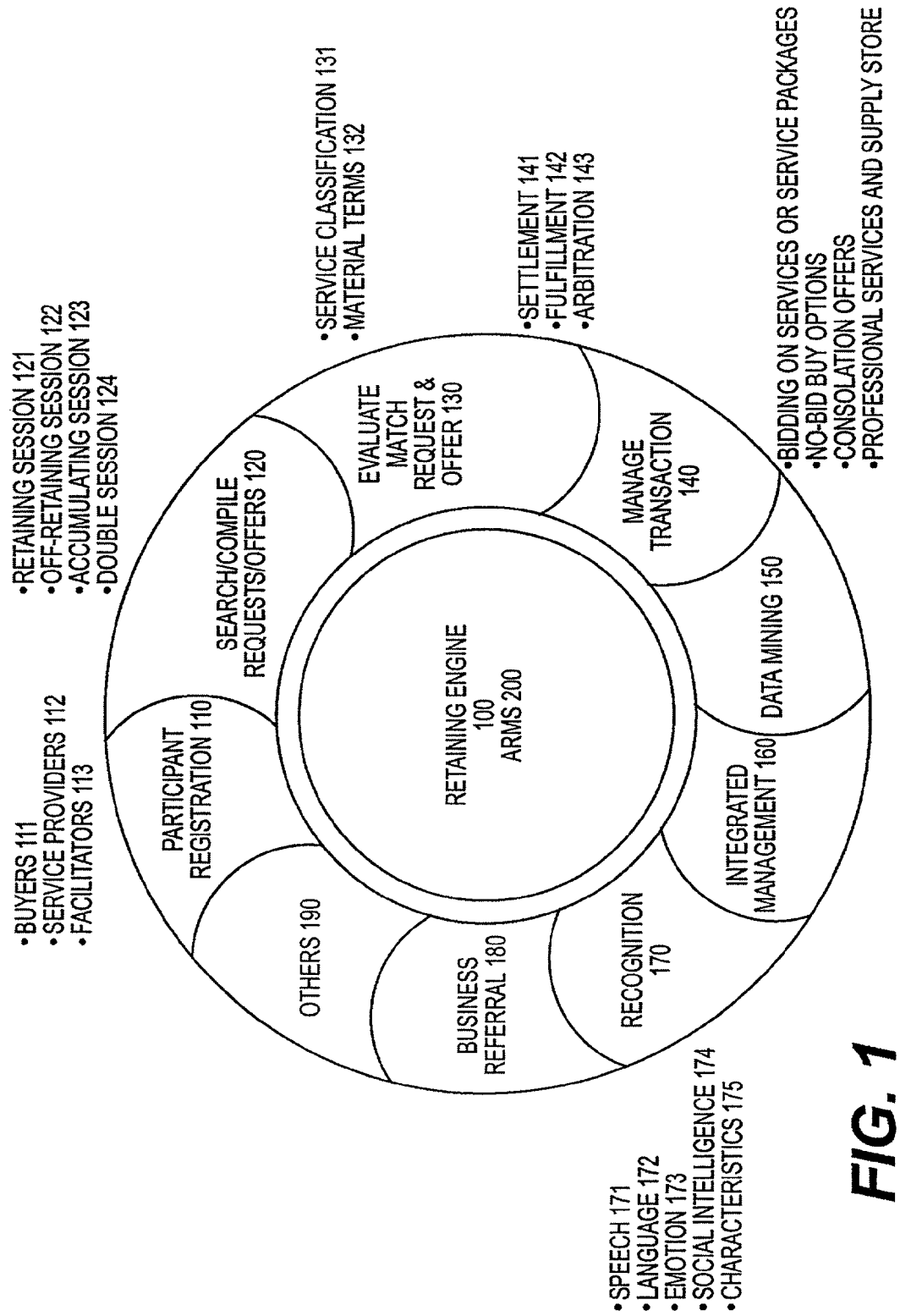
FIG. 1 is diagram illustrating the technical functions of the Retaining Engine and the Automated Retaining Management Systems according to the present invention.
Figure 2:
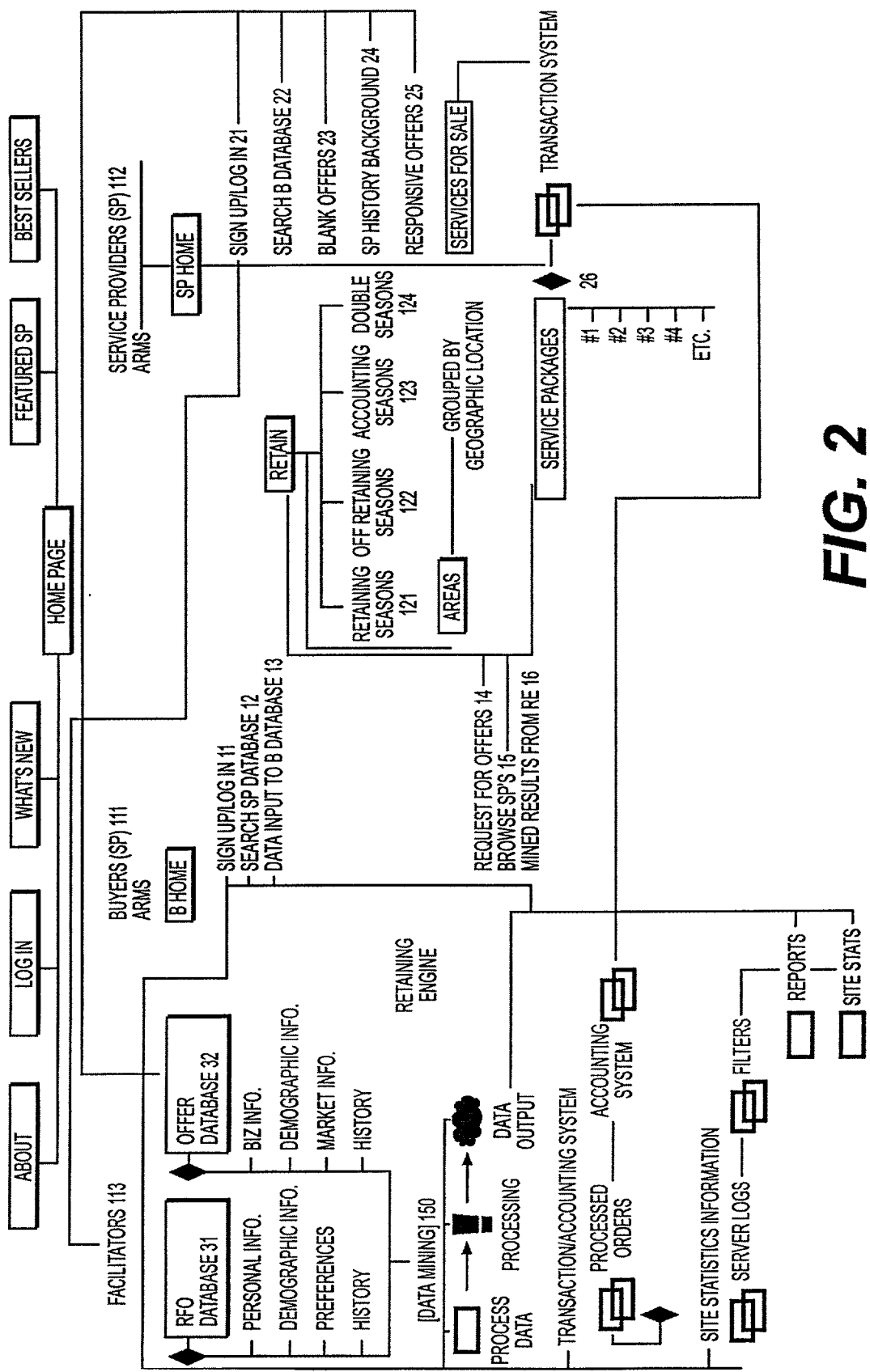
FIG. 2 a schematic view of the interactions among the buyers, the service providers, and the Retaining Engine in the service marketplace according to the present invention.

In order to more clearly and concisely describe the subject matter of the claims, the following definitions are intended to provide guidance as to the meanings of specific terms used in the following written description. Also it is to be understood that the phraseology or terminology employed herein is for the purpose of description and not of limitation. As used herein:

"Services" include any act of assistance or benefit to other(s), such as the services classified according to the Universal Standard Products and Services Classification (UNSPSC) Code, the U.S. Standard Industrial Classification (SIC) system or the like.

"Service marketplace" includes any tangible or intangible place where services are offered for sale or transacted. A tangible place may be a law office in Falls Church, Va., and an intangible place may be a H. R. Block website.

"Participants of the Service Marketplace" include but are not limited to service providers providing the above-mentioned services, purchasers intending to purchase services, and facilitators facilitating transactions of services. The facilitation of service transaction, such as customer data mining or customized marketing, also constitutes one type of service to be transacted in the service marketplace. Facilitators include any third parties which are not directly involved in service transactions. For example, the Retaining Engine of the present invention functions as a facilitator to a service provided by a contractor to a buyer as well as to a service provider when hosting a service provider's website. In other words, the designation of roles depends on each service transaction rather than a fixed label to a participant.

"Requests for offers" ("RFOs") include general solicitation for offers to buy services which are proposed by interested buyers and which do not address as a particular blank offer to sell, as well as general solicitation for offers to sell which are proposed by service providers and do not correspond to any particular offers to buy. Such solicitation is merely an invitation for offers, which has no binding effect. To simplify the discussion, the phrase generally refers to Requests for offers to sell in the application.

"Blank offers" include general offers to sell which are proposed by services providers and do not respond to any particular offers to buy, as well as general offers to buy which are proposed by purchasers and do not respond to any particular offers to sell. Offers become binding once they are accepted by the offerees. To simplify the discussion, the phrase generally refers to Blank offers to sell in the application.

"Responsive offers" includes acceptances or counter offers which are proposed by services providers responsive to respective offers to buy, as well as acceptances or counter offers which are proposed by purchasers in response to respective offers to sell. Responsive offers become binding once they are accepted by the original offerers. To simplify the discussion, the phrase generally refers to responsive offers to sell in the application.

"Transactions of services" includes exchanges for services with any forms of consideration, and exchanges services for services.

"Considerations" include any benefit to promisee or a third person, or any detriment sustained by a promiser. Considerations may be in a form of money, goods, real estate, intellectual property (via assignment or license), services, or even love and affection.

"Description of Services": each project should be dissected into components of services according to the above-mentioned service classification codes. Each component of service may be further dissected into more detailed indexes to increases comparison efficiency and billing accuracy. For example, Incoterms© are most commonly used in shipping service definitions promulgated by the International Chamber of Commerce, such as Free On Board (FOB).

Each "service package" contains two or more complementary or co-branding services; for example, bundling 40 hours of transcription secretarial/paralegal services with billing services.

"Material terms" of a service transaction are a set of standardized features, requirements, symbols and terminology regarding technical and quality characteristics of services. The material terms include, but are not limited to, price (covering cost, margin of preference, reimbursement for transportation, lodging, insurance, use of equipment, duties or taxes in one currency or currencies); terms of payment and of guarantees in respect of the services; completion timeframe; service quality; locations of performance and delivery of services; functional characteristics of services; deadline(s) for response to a purchase request; availability of service packages; past performance, trade records, consumer reviews; requirements concerning testing and test methods, packaging, marking or labeling or conformity certification and symbols and terminology; extent of participation by local service providers or labor; transfer of technology, the development of managerial, scientific and operational skills; negotiations with the buyer or other service providers; counter trade arrangements offered by providers; criteria to be used in determining the winning offers, including qualifications, experience, reputation, reliability and professional and managerial competence, and the relative weight of each criteria; alternative methods for evaluating and comparing offers; means for service providers to seek clarifications of the request for offers, references to the laws and regulations directly pertinent to the purchase; any formalities that will be required once an offer has been accepted; after-delivery customer services; service provider's right to review other offers, and combinations thereof.

"Provider's right to review other offers": any service providers that claim to have suffered, or that may suffer, loss or injury due to a breach of a duty imposed on a purchaser by law, such as discrimination, may seek to review the winning offer.

"Gap-fillers" for unspecified material terms include default terms adopted by the present invention, or acknowledged by service trade associations or the service industry, or default terms agreed upon by a service provider and a purchaser according to their course of dealings.

"On-line": on the internet

"Off-line": off the internet, i.e. the physical world rather than the cyberworld, which includes any close communication communities, such as the VISA payment network.

"Retaining session" is a set period of time for (1) a participant to collect responsive offers; or (2) the retaining engine to accumulate a collective offer or a collective request for offers (i.e. an "accumulating session"). A "Double session" is an accumulating session for a collective RFO/offer to start at the same time with a retaining session for offers/RFOs. Auctions are a special species of retaining sessions, which focus on price rather than all material terms.

"Off-Retaining session" means a buyer searching for blank offers without publishing any request for offers. In case of emergency, a buyer can accept blank offers assuming that the respective service providers set their blank offers to be binding upon acceptance.

"Collective offers /requests for offers" consist of incremental retaining amounts for service(s) accumulated during an accumulating session offered by a group of SPs or a group of buyers which are interested in selling or buying the involved services.

The present invention provides the infrastructure of a service marketplace which allows services to be freely traded as goods, stocks or commodities (primary goods such as agricultural or mining).

Legal Infrastructure: Services Classification & Material Terms

The conventional seller-driven service transaction systems are not prevalent because buyers do not want to be inundated with numerous blank offers from service providers, many of which may be marginal or unqualified. On the other hand, the conventional buyer-driven systems, such as governmental purchasing or bidding systems, impose inherent costs on service providers just to collect and review each buyer's different sets of purchasing specifications which are in non-uniform commercial or technological terms. In the present invention, the problem is eliminated by the automatic retaining system which adopts a common set of terms for all the participants of the service marketplace to describe the relevant services and contracts, i.e. in terms of standardized services classification and material terms.

If a buyer wants to contract out a project of building a new hospital, the buyer needs to first classify the project into pieces of services according to the classification of services, and then describe the implementation of each piece of service in the material terms. For example, to build a new hospital, a buyer will need commercial Realtor services for finding the potential locations, architectural services for designing the physical structure of the hospital, loan brokerage services for negotiating and securing a loan to finance the project, construction services for building the hospital, and legal services for negotiating and preparing all the relevant contracts among the parties in the material terms. The construction services may be sub-classified into plumbing, mechanical, electrical, etc. Then each component of the sub-classified service is described in the material terms.

The marketplace is organized around all services available worldwide. According to one embodiment of the present invention, the services are broken down into classes and subclasses then associated with service providers. In one embodiment of the present invention, the services are classified according to the Universal Standard Products and Services Classification (UNSPSC) Code at http://eccma.org/unspsc/. For example, class 621 "Ambulatory Health Care Services" is divided to the following subclasses:

```
621    Ambulatory Health Care Services
 6211   Offices of Physicians
  62111  Offices of Physicians
   621111 Offices of Physicians (except Mental Health Specialists)
   621112 Offices of Physicians, Mental Health Specialists
 6212   Offices of Dentists
  62121  Offices of Dentists
 6213   Offices of Other Health Practitioners
  62131  Offices of Chiropractors
  62132  Offices of Optometrists
  62133  Offices of Mental Health Practitioners (except Physicians)
  62134  Offices of Physical, Occupational and Speech Therapists and
         Audiologists
  62139  Offices of All Other Health Practitioners
   621391 Offices of Podiatrists
   621399 Offices of All Other Miscellaneous Health Practitioners
```

The services are further classified according to the ICD-9 coding incorporated into the Medicare Reimbursement Code which was approved by the Health Care Financing Administration (HCFA). ICD-9 breaks down treatments into detailed procedures. As an example, treatment of cancer is further broken down into chemotherapy. A more recent ICD-10 code is being developed by the World Health Organization (WHO) which contain the entire list of official descriptions of diseases and health related problems, i.e., the diagnosis or reason for a patient episode of health care. This example of medical service classification may be modeled for other type of services then promoted over the internet so as to develop a complete set classification of services which also evolves along with the social and cultural changes.

Currently, there is no public legal infrastructure customized for service contracts in place. Most of the public legal infrastructure was designed for contracts for goods. For example, each state in the U.S. has its own version of the Uniform Commercial Code (UCC) which facilitates transactions of goods (rather than services) under a set of pre-agreed terms and conditions. Internationally, the United Nations Commission on International Trade Law (UNCITRAL) has developed a model law supporting electronic commerce of goods (but not services). The evolving Uniform Computer Information Transactions Act (UCITA) is designed only to harmonize the law regarding computer information transactions. The only model law relates to services is the UNCITRAL Model Law on Procurement of Goods, Construction and Services, which was created in the 1980s and is only applicable to governmental entities.

With respect to the efforts of the private sector, Bolero is backed by about 120 banks and logistics firms so as to set up a global technical standard for transmitting commercial documents or contracts around the world via incompatible computer systems and bureaucrats.

There is a need for a set of rules and norms adopted by the service industry and governments that validates and recognizes service offers or contracts, whether through electronic means or not. The present invention establishes standard services classification, material terms, as well as technical protocols and formats to be used in services offers and requests for offers to promote easily understood and assessed service transaction opportunities. The laid-out material terms of the present invention in a request for offers or an offer saves time and costs in negotiating terms. Specific circumstances of different services should be developed by the relevant trade or professional associations according to industrial customs, course of dealings, or mutual agreement of parties.

The greater the number and complexity of the material terms, the more difficult for a service provider to evaluate the profitability of a request for offers. As such, the number of competing service providers declines. To solve this problem, the present invention develops a Retaining Engine working in conjunction with a plurality of Automated Retaining Management systems to enable a participant in the services marketplace to efficiently evaluate a plurality of offers or Requests for offers to make a decision.

Technical Infrastructure: Retaining Engine/Automatic Retaining Management System As a brief overview and referring to FIG. 1, a neutral computer-implemented system for negotiating/performing continuous retaining auctions over a computer network, a "Retaining Engine" (RE) 100, has been developed to execute the functions of registering participant 110, searching and compiling viable RFOs/offers 120, evaluating and matching RFOs/offers 130, managing transactions 140, data mining 150, integrated business management 160, speech/language/emotion/social intelligence/character/characteristic recognition 170, business referrals 180, and others 190, so that the participants of the service marketplace can freely, almost instantly, transact services or service packages like transacting stocks at the NYSE. Alternatively, these functions can be executed through more than one component of software or by a cluster of computers. For example, a plurality of individually fully automated retaining management systems ("ARMS") 200, including accounting, maintenance and operation, installed independently at a buyer's or SP's computer working in conjunction with a central hub to carry out the RE's functions. The ARMS 200 can be installed directly on an SP's server to allow an SP to either manage their own postings/auctions, co-brand with others, or communicate with the RE 100.

The RE preferably resides in a central server associated with one or more ARMS servers. Each ARMS resides in a ARMS server and is associated with one or more SPs. Some ARMS servers are remotely located from the central RE server but selectively integrated with the central RE server so as to prevent one SP from accessing, obtaining or altering any proprietary information of another SP without authorization. Each ARMS server contains sensitive information, including price flexibility and available scheduling, of at least one SP, which, if known to other SPs or purchasers, could dramatically impact the SP's negotiating power. Thus, according to a feature of the present invention, the proprietary information is securely stored by each ARMS server, to prevent one SP from accessing, obtaining or altering the proprietary information of another SP. In another embodiment, the secured ARMS servers utilize encryption or biometrics techniques and database access control mechanisms.

The architecture of the retaining engine is open so that it is flexible with any add-on features known by one skilled in the art, such as inserting logos and buttons created by SP's into requested headers, footers, frames, multi-file up loader, animated banners, link popularity, keyword pointers, chat rooms, bulletin boards, video and audio interaction, etc. For example, a "Hire Now" feature allows employers to work with the employment SPs or other affiliated SPs and gives the added feature of hiring an individual(s) instantly. This feature also has audio and video resumes and interview features.

The retaining engine is language-independent, and it supports cross-platform applications, such as Windows NT, Java, and Solaris platforms (XML, COM and CORBA), relational databases, such as but not limited to Informix, Oracle8 and SQL Server, or any invoicing and billing modules. The notification mechanisms of the present invention include E-mail, instant messaging, cellular phones, facsimile, business phone, personal pager, home phone, SMS phone, and any other requested method of contact.

In another embodiment of the present invention, a holographic image of a human figure is created to represent the RE 100, namely, a retaining agent 101, which is equipped with artificial intelligence to perform all the functions of the RE 100. A participant of the service marketplace may custom design such an image. The image may be assigned with human expression and reaction and interacts with a participant in a real-time manner. The RE 100 supports transmitting of such a holographic image over a computer network or satellite system on a real-time base. The RE 100 further facilitates social interactive intelligence over a computerized network, holographic downloads, projected holographic imagery over a computer network, i.e., holographic projections, holographic optical networking, holographic fiber optics communications, holo-speed optical routing, interconnect and cross connect holographic communications over a computerized network, and communication of holographic imagery and video over computer networks, including the Internet, whether accessed by personal computers, cellular phones, PDAs, or another access means. The RE 100 further supports holographic spatial interaction, holographic rapid image generation over a computerized network, auto stereoscopic secular optical viewing of holographic imagery over a computer network, holographic environments over a computerized network, smart holography and intelligent holography in relation to holographic imagery over a computer network, and holographic optical computing over a computerized network.

The RE may collect fees for registration, posting requests for offers/offers, closing transaction, searching and compiling offers, authentication, arbitration 143, data mining, etc.

Figure 3:
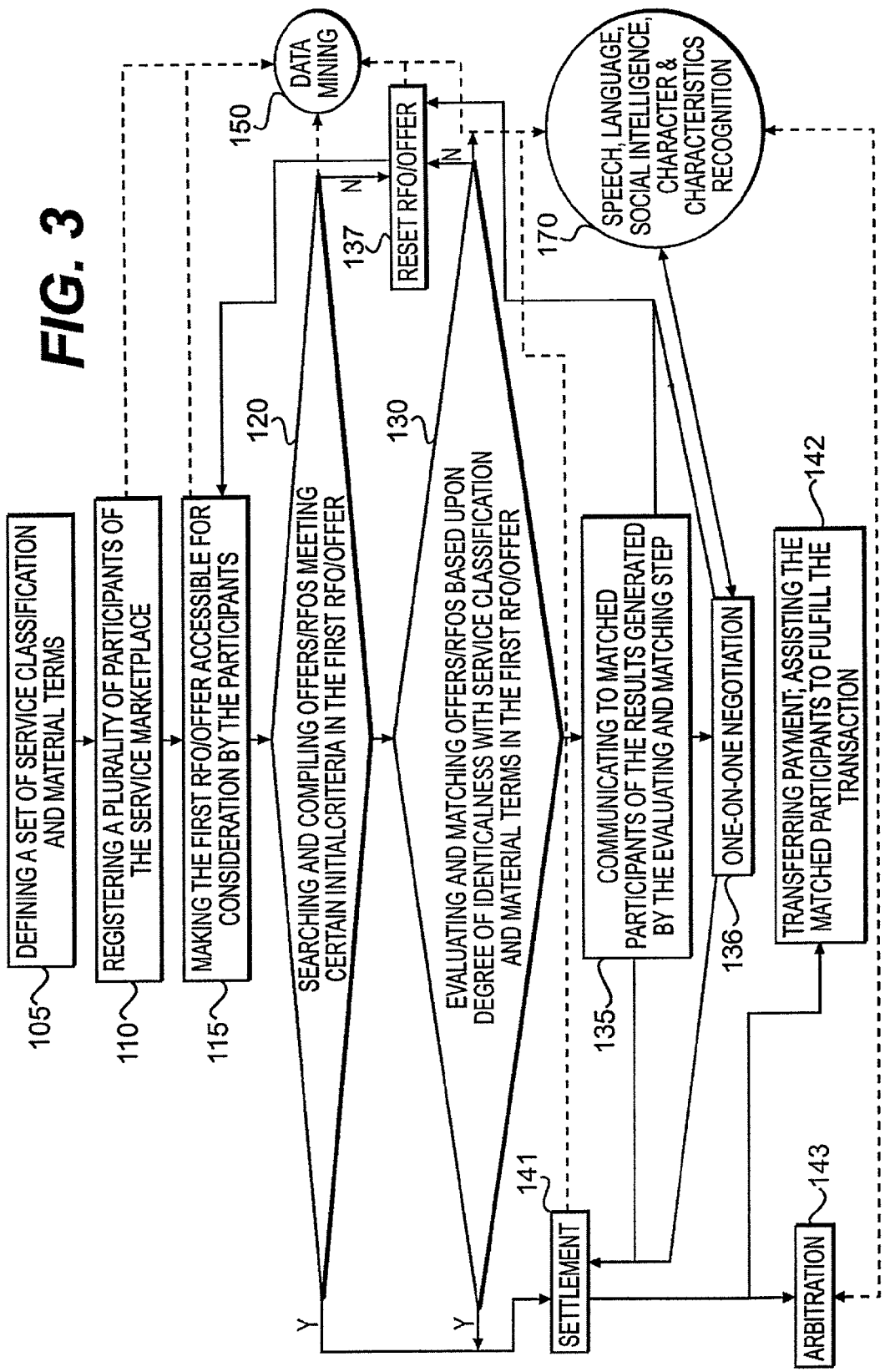
FIG. 3 is a flow chart illustrating one embodiment of the operation of the Retaining Engine of the present invention.

FIG. 3 shows a flow chart illustrating one embodiment of the operation of the Retaining Engine 100. The RE 100 first defines a set of service classification and material terms in step 105, registers a plurality of participants of the service marketplace in step 110, then makes the first RFO/offer accessible for consideration by the participants in step 115. After a retaining session is required by a buyer, the RE 100 searches and compiles offers/RFOs meeting certain initial criteria in the first RFO/offer in step 130. If there is a complete match, a transaction is settled in step 141. If there is no complete match but some offers/RFOs meet certain initial criteria in the first RFO/offer, the RE 100 either resets the first RFO/offer in step 137, or proceed to step 135 to evaluate and match offers/RFOs based upon degree of identicalness with service classification and material terms in the first RFO/offer. If there is a substantial match, a transaction is settled in step 141. If there is no substantial match, the RE 100 communicates the results generated by the evaluating and matching step to the buyer in step 135. If the buyer is interested in one-on-one negotiating with some service providers, the RE 100 will facilitate the negotiation in step 136 with the support of data mining conducted in step 150 and the Speech, Language, Social Intelligence, Character & Characteristics Recognition conducted in step 170. The negotiation may lead to settlement in step 141 or reset the first RFO/offer in step 137. After a transaction is settled in step 141, the RE 100 transfers payment and assists the matched participants to fulfill the transaction in step 142. If the matched participants dispute the terms of the settled transactions, they may elect to arbitrate in step 143.

Registering the Participants 110

To provide a safe and fair service marketplace, any participant is required to register with the retaining engine 100 so as to effect a transaction in the service marketplace. Each participant provides the information of a name, a user name or I.D., and a financial account number, such as, but not limited to, a credit card, checking account, savings account or escrowed retainer account, an image, video or textual description of a service or package of services, and a Universal Resource Locator (URL) indicating a location of the image, video or textual description of the service or package of services, the location of server or a computer on the network. The RE 100 then assigns a user identification to a registrant.

The RE 100 maintains a participant's anonymity if the participant so requires. For numerous privacy and competitive reasons, customers and SPs often prefer not to have their identities revealed in commercial transactions. Each registered participant transacts with an identification number stored and secured in a database.

The RE 100 prevents a third party who does not know the registered user's ID and password from participating in an invitation-only transaction. The RE 100 also prevents a person having no encryption key from conducting wiretapping for data concerning a retaining session or falsifying the data concerning such a retaining session.

Searching and Compiling Viable Offers 120

The participants of the service marketplace may post blank offers 23 of their service(s) or package(s) of services, which may include their business history or background 24, or request of offers 14 on a webpage which is hosted by the RE 100, a ARMS 200, or other servers. The descriptions of RFOs 14 and offers 23, 25 are provided in the services classification 131 and material terms 132 commonly used in the service marketplace so that the RE 100 searches more effectively via the available databases for viable matches than those defined in non-standardized terms and languages. If there are any descriptions of services or service packages 26 or offers 23, 25 are not prepared in the terminology of the service marketplace, the RE 100 spots for equivalent terms and clarifies with the posting participants. Posting all offers in a centralized location is preferred in order for the participants to search easily.

A buyer may order the RE 100 to search all available databases, on-line or off-line, for viable blank offers 23 without publishing a request for offers in the service marketplace. This feature is commonly used by general contractors for outsourcing subcontractors or by SPs for retaining complementary services. For example, a general contractor instructs the RE 100 to search for qualified subcontractors, the dates they are available to perform the work (services), and the minimum price (e.g., hourly wage). More commonly, a buyer usually publishes a request for offers to receive responsive offers 25. Any SP can browse the posted request for offers. If an SP intends to accept any browsed request, the SP submits a responsive offer 25 to the RE 100 during a retaining session 121 or other similar accepting periods. From the starting time of the retaining session 121, such as 9 a.m., the buyer may elect to settle the first exactly matching offers or evaluate all viable offers at the end of the retaining session 121, such as 5 p.m.

Even if a buyer has posted its request for offers, the buyer can still request the RE 100 to search for blank offers 23 in conjunction with a retaining session 121. The RE 100 pre-qualifies offers by searching for viable blank offers 23 and screening responsive offers 25 which meet one or two necessary terms ("initial terms") specified in the request for offers 14. The number of initial terms is preferably limited to one or two to ensure the RE 100 will search efficiently during the preliminary screening stage. All the material terms will be considered in the evaluating and matching stage 130 discussed in the next section. The complied lists of viable offers is presented in a chosen format by the buyer in step 135 of FIG. 3. The required formats may include text, table, highlights of key terms, ranking according to price, location, or posting time, graphics or video, etc. For example, a large corporation may want to integrate open and scalable RE capabilities into its existing websites and business models. The information may be aggregated onto an accessible web page, an e-mail, or a document sent by fax, courier or mail, etc., and collected for data mining in the step 150.

If an emergency occurs where services are needed immediately and there is no time to negotiate, a buyer can accept blank offers 23 posted by SPs (if the offers are allowed to be binding by acceptance) in order to expedite the transaction, which is a type of "off-retaining session" 122 purchase.

If there is no viable offer, the request of offers 14 shall be reset in step 137 by the RE 100 or the buyer for another retaining session. Alternatively, the RE 100 automatically matches the closest offer according to some alternate initial terms, such as quantity range, quantity range, or other range of a material term designated by the buyer.

The traditional means for submitting requests for offers 14 or offers 23, 25 are also acceptable, such as telephone, facsimile, on-line access, e-mail, and in-person contact or through an agent.

Besides a public retaining session, a buyer may hold a private retaining session and invite only a group of selected service providers by providing such a list of SPs to the RE 100. The RE 100 will only inform those service providers to participate. The private session significantly reduces the number of responsive offers 25 so as to expedite the process. To compile such an invitation list, the purchaser may give some simple conditions for the retaining engine 100 to search by I.D. number, by title and description, words to exclude, price range, service classification, service location, payment method, feedback, insurance, escrow services, authentication, investigations, dispute resolution, specific listings, etc. Similarly, a participant may set up a boycott list to exclude some other participants with poor trade records or other negative reputation from submitting offers or browsing the requests for offers 14.

In another embodiment, the RE 100 stores all offers or the compiled offers in an offer database 32. A buyer may browse offer database 32 by services classification or any material terms to identify relevant offers meeting with their requests for offers. The RE 100 also stores all received requests for offers 14 in a RFO database 31. Any SPs may browse the RFO database 31 by services classification or any material terms to identify relevant requests within their qualification, inventory, operation schedule, etc, as set in their automatic scanning preferences. In another embodiment, an SP may be required to provide qualifications in order to view certain requests for offers if the relevant buyers so require.

Information regarding retaining sessions 121 is accessible from a participant's terminals. The display may be customized with unique user interfaces and supplemental applications. For example, the retaining engine 100 uses a software interface to relate information predicated upon the geographical area of a browsing participant which the participant may be desired, or to relate the participant's preference obtained via data mining 150. The purchaser is presented with several options including a "viewpoint" map, which may comprise, for example, an actual visually displayed map of a selected geographical area, or text information, which pertains to the resources, associated with the selected geographical area. A geographical database, a local content database and a yellow pages database are provided to allow the purchaser to obtain information at different levels. The geographical database allows the purchaser to browse through different geographic areas which are ordered hierarchically, while the local content database includes information about services available within a given geographic location and the yellow pages database includes information about specific services in the geographic location. Thus, the purchaser is provided with a means whereby information which is associated with particular geographic locations can be readily accessed. This breakdown feature is an added benefit for rural and small SPs, in addition to areas where delivery or pickup is available or requested, such as livestock and grain, construction materials. The geographic break-down feature is especially important for services involving labor, unions, professional licenses, local contain requirements, heavy equipment or materials, or other factors with geographic restrictions, such as any unique taste of agriculture products. With respect to labor, unions, professional licenses, or local contain requirements, there are additional local laws or practices to be satisfied. With respect to heavy equipment or materials, the major concern is shipping cost and methods. All there factors can either be set as a preliminary factor for viable RFOs/offers search in the searching and compiling step 120 or as a material terms to be evaluated in the evaluating and matching step 130.

Matching Offers: Evaluation and Comparison of Proposals/Offers 130

As mentioned, the RE 100 significantly accelerates transaction speed and brings the viable offers directly to a purchaser regardless of geographical location. The RE 100 compares competing offers in real time and selects an offer by material terms 132. In addition, the RE 100 itemizes cost so as to determine the total cost of the request. Such a "total cost functionality" is supported by the integrated management tool 160 which enables buyers to make purchase decisions based not only on price, but also on multiple criteria such as quality, delivery time, etc. The buyers determine a deal via a comparison table generated by the RE 100, or the RE 100 makes the decision on behalf of the buyer.

The viable offers are evaluated and compared to the proposals that have been accepted in order to ascertain the successful proposal in accordance with the procedures and criteria set forth in the Request for proposal. Among all the viable offers, one offer is usually selected according to a set of criteria for determining the winning proposal, including qualifications, experience, reputation, reliability, professional and managerial competence and/or any other material terms 132 according to the relative weight of each term. The selected SP is notified that it has "won" the business at the price quoted and should be prepared to settle the transaction in step 141. If there are no acceptable offers, a retainer is reset in step 137. When no SP is interested or there is no matching offer, the request for offers will be reset to be less stringent, such as by lowering qualification requirement, increasing the maximum price, etc.

The criteria shall, to the extent practicable, be objective and quantifiable, and shall be given a relative weight in the evaluation procedure or be expressed in monetary terms wherever practicable. No criteria shall be used that has not been set forth in the Request for proposal unless the purchaser has stipulated in the Request for proposal regarding additional criteria. For example, the buyer requires that a winning offer shall be the offer with the lowest proposal price, subject to a margin of preference specified in the request for offers. The lowest proposal price includes the cost of operating, maintaining and repairing the services or a subject, such as a hospital. The secondary criteria would include the time for completing the hospital, the functional characteristics of the hospital, the terms of payment and bonds. Some offers will be disqualified even if they passed the viability test since they fail some other legal requirements. For example, certain types of SP's are licensed in one state but not another, such as medical doctors, lawyers, etc.

Preferably, each of the qualified SP(s) is prioritized into a hierarchy based on the criteria in the appropriate order. For example, SPs may be automatically assigned a priority in the hierarchy based on the price, then chronological order in which their automatic acceptances are received by the RE when the price is the same. When the receipt time is the same, the past performance or geographical proximity of the compatible offers kicks in.

When the amount of qualified services (maybe accumulated from a number of offers) are more than requested, the buyer either takes those first corners or resets the material terms 132 to be more stringing according to the alternative methods for evaluating and comparing listed in the Request for offer. The third option is to proceed to a post-session auction for the qualified SPs to propose new offers. A fourth option is to proceed to a one-on-one negotiation between the buyer with hand-picked SPs from the qualified SPs.

If the buyer allows SPs to conditionally accept the Request of offers, the qualified SPs may submit counteroffers. The counteroffers are again prioritized into a hierarchy based on the predetermined criteria.

The RE 100 prohibits one SP or one buyer to probe for undisclosed prices, price range, or flexibility with certain material terms 132 by sending multiple RFOs or offers containing a progressively increasing price in order to identify the counterpart's undisclosed material terms 132. Since each RFO/offer becomes binding upon the acceptance of an offeree, the buyer will either accept the first matching offer or choose the best offer collected during a retaining session. In other words, if a buyer sets up a retaining session, SPs are discouraged from submitting multiple responsive offers containing a progressively increasing price since the offers will be considered all together at the end of the section. Alternatively, the buyer can directly limit the number of offers to be submitted by one SP in the request for offers and the RE 100 will execute accordingly by bouncing back any additional offers beyond the set number limit.

When a retaining session 121 proceeds as an auction, SPs or buyers receive e-mail notification when they have been outbid. The RE 100 automatically updates the all bids. Confirmation and congratulatory notices will be sent via e-mail to a winner.

Multiple Participants Environment: Collective RFOs or Offers, Double Session

The RE 100 supports a multiple-participant environment which not only hosts retaining sessions for multiple SPs to compete for a RFO or multiple buyers to compete for an offer to sell, but also hosts accumulating sessions 123 to accumulate REFOs or offers with incremental amounts into one collective RFO or offer. The participants of an accumulating session 123 may be affiliated via a franchise, association, business or merely a group of individuals/corporations formed exclusively for the purpose of retaining services and or packages of services. The participants place incremental retainer amounts (IRAs) in the area of retaining group 43 by accepting the same material terms 132 except for some individualized terms such as volume and schedule.

Before the starting time of an accumulating session 123, one or more organizers will prepare and publish a request for retaining members in a matter similar to a request for offers but including additional terms for binding the member with the collective agreement. The collective agreement usually stipulates a target retaining amount to gain buying or selling leverage and a mechanism to distribute a deficiency or surplus. The accumulating session 123 then proceeds similar to a retaining session. A collective agreement shall specify whether participation in the retaining session is conducted after effecting a retaining group, whether the retaining group will be resolved if the total amount of the REOs/offers is less than the target.

At the close of an accumulation session, if the accumulating session 123 accumulates a total amount sufficient to cover the target, each individual IRA contributed to the total IRA is matched by registered user identification number to a corresponding retaining group account, and each IRA entered by a buyer or an SP are recorded by the RE 100 a individual retaining amount and a member I.D. The RE 100 then functions on behalf of the retaining groups to facilitate the transaction, charge or credit according to the respective IRA amount of an SP of a buyer.

A collective request for offers is handled as a regular request for offers as discussed above. The RE 100 organizes a retaining session for offers usually after the collective request has been accumulated. A collective offer is accumulated as discussed above, which usually finishes accumulating before a retaining session starts so that the collective offer may compete with other regular offers.

It is possible to start an accumulating session 123 for a collective RFO/offer along with a retaining session for offers/RFOs ("double session" 124). There are at least two possible outcomes at the end of the double session 124. When the amount of the accumulated amount of the collective RFO/offer is less than the total amount of offers/RFOs, the RE will evaluate the offers according to the criteria set by the retaining group. If the amount of the accumulated amount of the collective RFO/offer is more than the total amount of offers/RFOs, the RE 100 will execute the distribution as instructed by the retaining group or according to the collective agreement. During the double session 124, the accumulated retaining amount is updated and published real-time when each IRA is added to the total amount.

If the accumulated offers is lower then the target, the RE will distribute the offered amount per rata or in an agreed hierarchy. Alternative, the RE 100 organizes another accumulating session 123 with better terms to compensate the deficiency or with stringer terms to defuse any surplus.

When the RE runs a double session for all the participants rather than a specific retaining group, no preference is given to any retaining group (collective requests or offers) and request and offers are treated equally as in a stock exchange, in which buyers enter competitive requests and sellers enter competitive offers simultaneously, as opposed to a buyer-driven or seller-driven market, wherein transactions are initiated and dictated by buyers, or the traditional SP-driven market, wherein transactions are initiated and dictated by SPs.

Managing Transactions 140: Settlement 141 & Fulfillment 142

A key element necessary to achieve a critical mass of the service marketplace is the buyers' or SPs' ability to bind the other party to a legal contract under the terms of a responsive offer or a counteroffer. In contrast to a non-binding blank offer, a binding offer is attractive to potential participants because it sets out each and every material term and condition under which the other party will be bound without additional time and cost of negotiating. This key element is embedded in the RE 100 and within the automatic retaining management system 200 (ARMS). The traditional non-binding blank offers or solicitation are still available for participants who would like to have continuing negotiations for complex deals or any other circumstances.

Additionally, the RE 100 automatically effectuates performance of the agreement between the parties by guaranteeing payments according to an agreed-upon performance schedule. Before communicating a Request for offers to potential SPs, the RE 100 automatically authenticates the buyer's identification number against a registrant database. The RE 100 requires the buyer to submit undated financial information, such as a credit card number, to ensure that the customer has sufficient credit to pay the estimate or maximum price specified in the request. The RE 100 then assigns a unique tracking number to the Request for offers and globally disseminates the Request to potential SPs.

Besides credit cards, other payment modes include banking accounts, debit cards, electronic cash information, billing, invoicing, bartering or other non-monetary consideration, and combinations thereof.

A SP wishing to accept any browsed request will submit a responsive offer to the RE 100. The RE 100 time-stamps the received offers and verifies whether the Request is still "active" and capable of being automatically accepted. If so, the RE 100 then automatically authenticates the identity of the SP and its capacity to deliver the service(s) and or package of services. If a Request is capable of being automatically accepted only by one SP, it is automatically "completed" when the first qualified SP automatically accepts it. A unique automatic tracking number is assigned to a "completed" Request. The customer and SP are now parties to a legally binding automatic contract. Subsequent SPs will not be able to automatically accept a "completed" Request.

The RE 100 accepts various automatic payment methods, including but not limited to credit cards, personal checks, electronic funds transfer, debit cards, retainer escrow accounts, digital cash or bonds. If the buyer defaults in the contract period, the RE 100 will collect the payment from a escrow account, which is associated with the customer wherein funds automatically advanced by the buyer is kept by an escrow agent, or a third party bonding agencies which have verified and endorsed the SP's ability to deliver the contracted services, or any other means.

To assist SPs to deliver the services, the RE 100 offers information on financing, outsourcing, import/export law and procedures etc., provides interaction with colleagues and industry experts, or direct services with any task, projects or service(s). The RE 100 may be appointed by the parties to administer transactions and any relevant disputes. Alternatively, the RE may refer the dispute to a third-party arbitrator to resolve contract disputes and thereby increase buyer and SP confidence in the system.

Data Mining 150

Figure 6:
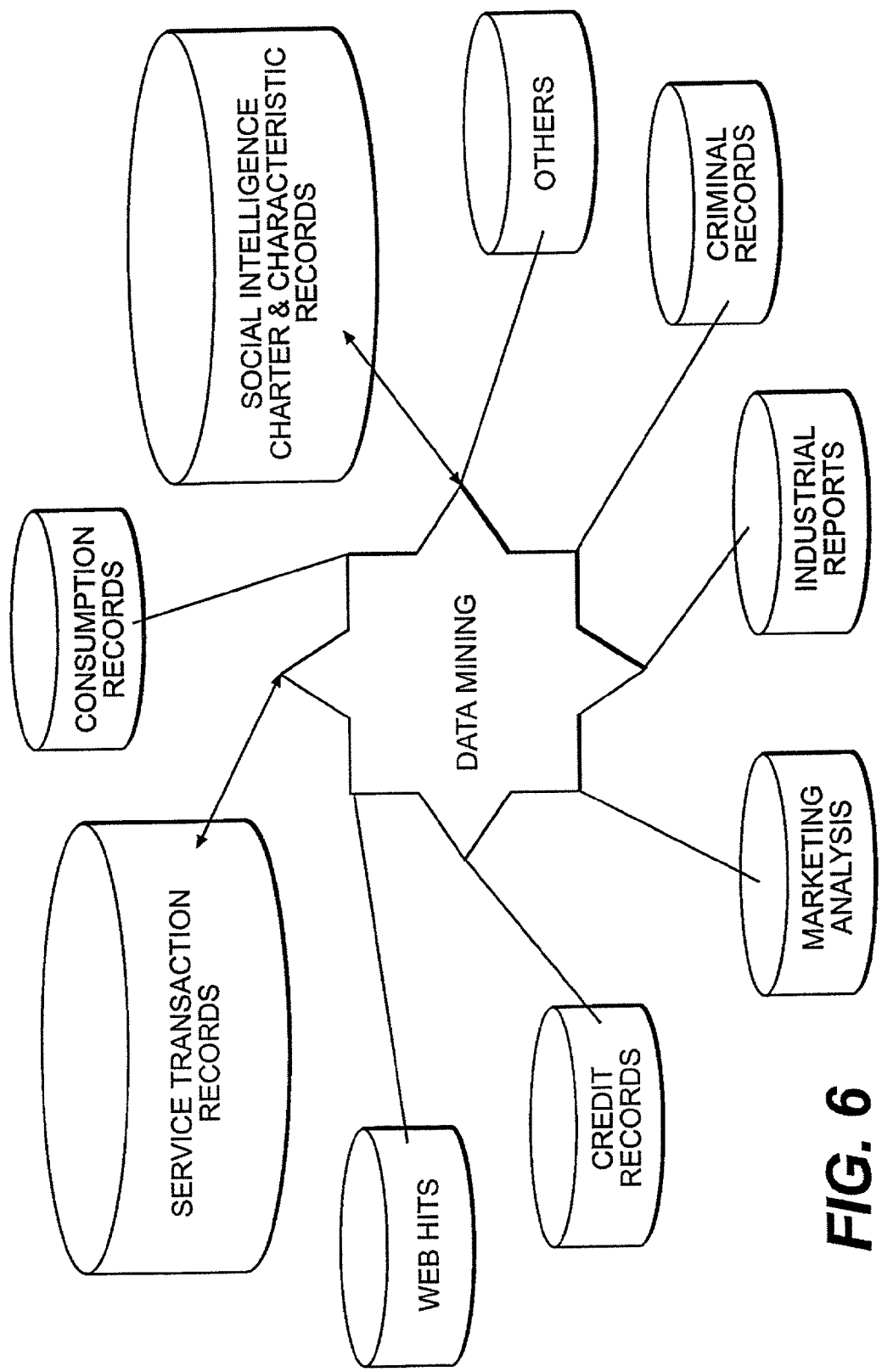
FIG. 6 is diagram contrasting the data sources for data mining of the present invention with prior art. In particular, one embodiment of the present invention further includes the data of the social intelligence, character and characteristics as well as the service transaction records in material terms.

As mentioned above, the conventional seller-driven service transactional system is not prevalent because buyers do not want to be bombarded with numerous offers from service providers, many of who may be marginal or unqualified. The retaining engine 100 supports a novel seller-driven service transactional system with a data mining feature to assist a buyer to screen SPs. Meanwhile, the RE 100 also uses data mining to assist SPs to approach targeted buyers in the competitive e-commerce. The use of demographic analysis to market featured goods that fit each participant's profile of interests and transactional records collected on-line or off-line are popular in the market for goods but not in the service marketplace. FIG. 6 contrasts the data sources for data mining of the present invention with prior art. In particular, one embodiment of the present invention further includes the data of the social intelligence, character and characteristics as well as the service transaction records in material terms.

E-commerce enabling consumers and businesses to search for all available offers boosts the competition across industries and market sectors worldwide, and customers are becoming more demanding and less loyal in their uncompromising search for that "just right" combination of service, and/or package of services and retainer/price to meet their individual needs and geographical location. As a result, companies are racing to discover what customers really want and to incorporate that value perspective into their overall market strategies and in every aspect of the way they do business. The need to understand customer behaviors and their impact on profitability over time is required to improve decision making to meet customer demands and create profit while effectively managing risk.

Data mining, or knowledge discovery, often via computer-assisted process, uncovers hidden patterns and relationships in data. Meaningful information or transactional attributes, such as consumption profiles, habits and preferences, is extracted from enormous databases through advanced statistical analysis and modeling techniques. Data mining has emerged as a key technology for companies that want to improve the quality of their decision making and gain competitive advantage by exploiting the data available to them.

In an interactive knowledge discovery environment supported by the RE 100, the background knowledge of a participant is combined with the underlying algorithms so as to derive transactional patterns or relevant information. As such, targeted content embedded in qualified offers will be supplied to focused audiences and lead to efficient and effective service transactions. Based on the service or package of services that the clients have already retained, data mining will find out what other offers of services that the clients would also interest the clients. In other words, data mining finds out the best ways to target potential customers. In one embodiment of the present invention, the RE 100 selects a linear algorithm, such as a simple machine learning algorithm, or a non-linear algorithm, such as a neural network model, or any hybrid combination, to generate noticeable patterns from millions of records and hundred of attributes.

Major data mining methods include predictive modeling (e.g., decision trees, neural networks, naive bayesian, branching criteria), database segmentation (e.g., clustering, K-means), link analysis (e.g., Rule association), text mining (e.g., Semantic maps), and deviation detection (e.g., visualization). Many off-the-shelf data mining algorithm tools, such as Basic data mining algorithm tools are Oracle® Express Serve, Microsoft® Decision Trees, Microsoft® Clustering, and are available to be used in conjunction with extensive researches conducted on user experiences and product functionality via e-commerce. Much off-the-shelf software, such as XpertRule® Miner (www.attar.com/tutor/miner.hLm), Oracle® Discoverer, Oracle® Reports, is available. These products, however, only address business decision-making needs at a freezing time point rather than a long-term period of time offered by the RE 100 or the ARMS 200.

Figure 4:
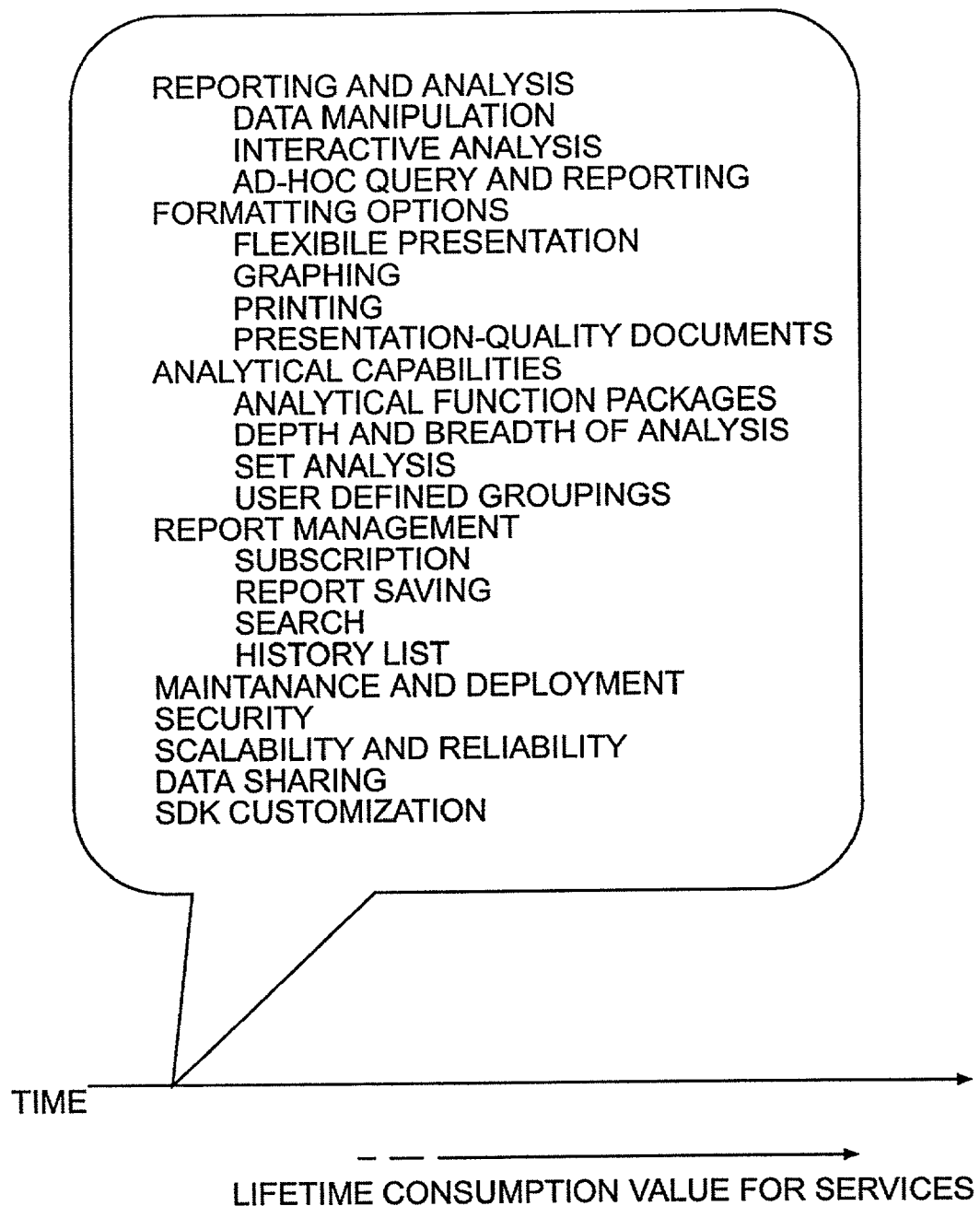
FIG. 4 is diagram contrasting the Lifetime Consumption Value for Services of the present invention with the traditional metrology of decision-making which focuses on one specific time point. * The features are the features of MicroStrategy Web™ available at http://www.microstrategy.com/oldstore/software/web/toc.asp.

For example, the ARMS 200 aims to determine which marketing effort should be adjusted, and to what degree, for optimal impact by measuring each customer sector's value in a forward-looking, consistent, and integrated manner, factoring in the interactions among marketing decisions across the customer portfolio and throughout the customer life cycle. The above-mentioned software is applied in a proactive rather than responsive manner. The ARMS 200 is not taking the stance of, "If I don't do x, then y will happen." Instead, it's "My goal is for y to happen in the future, what do I do now to make it happen?" In other words, the present invention is not seeking to make the best profit from the market at certain points of time but rather is seeking to make the best accumulated profit/value from the aggregated customers over the life time cycle, i.e. the lifetime consumption value for service ("LCVS") of a customer sector or an account. LCVS will be discussed in detail in next section. As shown in FIG. 4, the Lifetime Consumption Value for Services of the present invention intends to maximize the profit over a life time cycle rather than a specific time point as the prior art.

Precise, robust decision is the result of a framework that leverages multiple data sources and integrates statistics, neural networks and optimization technology. For example, the RE 100 converts customers' hits to leverage data for designing new services in conjunction with budgets, price models, etc. Such an approach not only considers past historical services that have been retained by the clients and transactions but also predicts future services and transactions broken down into specific markets and/or services or packages of services for optimizing customer(s)/client(s).

Since the transactional information collected by the RE 100 is well defined by the services classification and material terms of the present invention, the RE 100 or the ARMS 200 can analyze and summarize more effectively for interested consumers attributes or patterns of the service marketplace.

The ARMS 200 uses the robust optimization technique to look at different scenarios for cost and benefits of marketing services so as to optimize profits with the best solution, which goes beyond standard simulation application. The ARMS 200 models short-term events in detail, but, past a certain point, i.e., after an estimate of time, it just does a coarser grain forecasting. A SP may enter data about a newly-integrated construction approach, then the ARMS 200 cross-references the data-mining statistics and reports of the RE 100, then processes through its logic to simulate the best marketing approach. It could let the SP know how to adjust the new services to local needs according to local taste, weather patterns, local zoning regulation, and marketing.

Moreover, the RE 100 or ARMS 200 visualizes the new data into graphics or accumulates the new data into market reports. The data-mining feature of the RE 100 or ARMS 200 dramatically redesigns and improves marketing methods and delivers efficient and measurable marketing information. When used in conjunction with extensive demographic, socio-economic and lifestyle information, the RE 100 or ARMS 200 provides superior predictive models and brings actionable marketing information directly to the desktops of decision-makers. This information guides marketing executives to stronger, more client/customer-specific marketing decisions. For example, the RE 100 or ARMS 200 provides prospective buyers the preview of livestock and grain availability at different locations and available shipping method and routes for the respective locations on one chart.

The RE 100 or ARMS 200 utilizes a neural network-based data mining technology to enable users to create sophisticated predictive models of complex market forces and customer behavior, build models that not only reflect past historical services or packages of services and events and transactions, but also predict future services or packages of services and transactions. This allows for optimizing customer/client management strategies, including service, cross-selling and retaining, and cost control, and for proactively managing the relationship with the customer/client.

The data mining feature enables large and small SPs alike the opportunity to know more about a service marketplace participant, whether a customer or a competitor, so as to make informed decisions regarding what marketing efforts to expend on who, what, when and how to present an offer for services or packages of services. By knowing individuals' or companies' sensitivity to certain types of appeals, these service providers tailor their offers and services or package(s) of services specifically to an individual or company. The outputs of data mining tools are used to accurately predict individuals' or companies' likelihood of responding to a particular type of service(s) or package(s) of services offer so as to segment customer/client bases, run simulated marketing campaigns, and predict results before going into the field. The critical piece of the puzzle for marketers of all service providers, whether direct or virtual, understands which marketing mix will yield the best possible results in the customer universe.

The products of data mining 150 provides the information base for marketing to analyze and refine strategies for direct marketing campaigns, such as personalized weekly HTML services for auction e-mail newsletters to registered bidders (which will include particularly attractive opportunities for services), specific service management strategies, which match consumer's buying habits to geographic and demographic profiles, program offerings (i.e., polls, chats, games) to increase levels of regular participation, personalizing a webpage presentation around a professional service theme (wallpaper and custom cursors and screen savers), offers of customized services to meet specific needs. The data-mining feature also helps SPs track services or packages of services performance and customer satisfaction, measure advertising effectiveness, assess brand strength and competitive position, determine price sensitivity, and evaluate new services and packages of services, markets or other business opportunities.

The RE 100 systematically integrates data mining, prediction and forecasting capabilities with simulation and optimization technologies to enable SPs to proactively and precisely recommend services and/or packages of services, making decisions and maximizing financial returns with much more certainty and confidence. As a truly robust optimization instrument, the RE 100 empowers companies to determine the comprehensive cause and effect behaviors of each possible action combination to each individual customer/client. The RE 100 fully captures and measures the causal relationships and sensitivities between key decision variables and subsequent customer behaviors. Decision variables are those actions that management can proactively control and change. Experimental design expertise facilitates the collection of a rich and complete mapping of tested actions to find their impact on customer behavior over varying account profiles.

Furthermore, the RE 100 uncovers the complex patterns (between decision variables and customer behaviors) by leveraging the neural network technologies. World class testing methodologies, behavioral data observation and collection, and predictive model development form the strong foundation of advanced optimization solution.

This comprehensive view enables all SPs, especially those engaged in marketing and extending credit to their customers/clients, to make accurate decisions about each individual customer sector's value, closing the loop between data analysis and corporate strategic goals. By taking data mining to the long-term level, the RE method and system cross-cultural functionality leverages an SP's current analytical process into a robust, multidimensional picture of a customer sector's value over time. For example, the RE 100 converts hits into preference data to be stored in a data warehouse and to perform visitor analysis and enterprise reporting. Through the use of different tracking mechanisms (cookies, log analysis tools, etc.) data can be gleaned and factors that lead to purchases or other causal relationships can be identified. These results will then be cross referenced with those that were similar, but contained differences (did not purchase or recommend). Data gained from this process will allow the system administrator to view what behaviors and variables are more likely to lead to sales generations, etc.

In one embodiment of the present invention, the RE 100 uses independently developed data mining software. In another embodiment of the present invention, the RE 100 incorporates the above-mentioned commercial software to process internet log files and outputs reports on any number of topics and demographic information with a long-term perspective, which also works in conjunction with the data mining and data warehousing. SPs can extend their e-business analysis through campaign, content, commerce, and affiliate modules that provide powerful analysis.

With such a data-mining capability, the RE 100 can capture and measure the causal relationships and interaction effects of all customer/client behaviors in a complete and structured manner. The result is a fully integrated decision-making environment that provides SPs with detailed customer-sector level, or even account-level, action plans to structure their services or packages of services. While incorporating real-world business constraints and policy parameters, the RE 100 provides recommendations for producing maximum economic returns to each customer-sector or account.

The data-mining feature allows the ARMS to predict which client is likely to default on payment or switch to a competitor. Furthermore, the data mining feature is incorporated into the Integrated Management Tool to be discussed in next section so as to apply powerful predictive modeling, segmentation, and forecasting algorithms to the service marketplace beyond marketing or client management. For example, predictive models are helpful to solve marketing issues. But, once it is determined WHO is likely to buy and WHAT is the best marketing approach, the question of WHAT TO DO remains—whether to provide in-house or through outsourcing, and the pact on profit. The Integrated Management Tool will suggest the best, the optimal, proactive action to take with each customer sector to ensure you obtain the most profit over their lifetime.

The portfolio of customers is the most important asset of a business. Traditionally, predictive modeling and analysis have provided support for the decision as to what action to take. But the final decision of WHAT TO DO has frequently been made on gut feel alone. Models can predict WHO is likely to exhibit a particular behavior, such as response or attrition, but cannot proactively prescribe what to do to meet an SP's or organization's goals given this information. The RE's optimization environment simulates the future under varying scenarios and conditions giving the decision-maker full control to stress test and optimize strategic decisions before they are made.

In addition, the RE 100 provides a wide spectrum of data products, data integration services, mailing list services, as well as data warehousing and decision support services to SPs. For example, the RE 100 collects feedback about the quality of services based on the value of transactions, price, and participants' evaluations.

Integrated Management Tool 160

Fortune 1000 companies continue to turn to outside assistance for creative cost-and-time-management tools. Many companies are using advanced statistics to calculate the expected profitability of each account. When an event causes a particular customer's profitability prediction to drop below an acceptable level, a certain action is designated to occur. This is the problem. The "acceptable level" is set by the organization and the action to take when the prediction drops below this level is stipulated by the organization. No science is helping determine at what point something should be done and, more importantly, what should be done.

The present invention expends data-mining beyond customer relationship management into a fully integrated business management, including accounting, maintenance, operation, scheduling, etc. The comprehensive optimization metric of the present invention allows a participant to proactively reach and surpass the SP and or organization's profitability goals by providing scientific advice on what to do. As mentioned, the RE 100 or ARMS 200 is not taking the responsive stance of, "If I, don't do x, then y will happen." but rather a proactive one, "My goal is for y to happen in the fixture, what do I do now to make it happen?"

In addition, the lack of common success target within a organization has caused organizational divisions to clash over strategic decisions. The RE 100 or ARMS 200 enables managers in different areas of functional responsibility to make decisions consistent with overall long-term company success by utilizing a lifetime value metric (LCVS). This elevates their decision-making from a tactical to a strategic focus. While most profit-based scores or models are artificially truncated to reflect short-term measures, such as NOI, it capitalizes on forecast models that allow its optimization algorithms to develop a more comprehensive, LCVS decision metric. It breaks down LCVS into a series of properly discounted incoming and outgoing cash flows. Individual costs and revenues are aggregated into the most accurate representation of account value available today. It optimizes the overall strategic goals of the company, maximizing economic value over the long-term.

Moreover, the conventional scheduling systems with tools to anticipate excess capacity make forecasting errors and invariably lead to unanticipated slow times or excess capacity in workers. And conventional scheduling systems do not support forecasting slow times in a given time period and or geographical locations associated with labors to be available to provide service. Furthermore, unexpected external events, such as a price war or extreme weather conditions, can also affect an SPs scheduling and available service(s) and or packages of services. On the other hand, uncertainty is incorporated in a range of values to frame a decision with respect to the risk in the present invention. A user may include a range of scenarios, such as the predicted best and worst case scenarios, based on the participant's expertise.

The RE 100 or ARMS 200 simulates the marketplace based upon the results of the data-mining and operational constraints of a participant so as to determine an integrated business plan from a long term perspective, wherein the operational constraints includes asset, cash, capital, inventory, labor, staff, debt, liability, intellectual property, customer preference, competitors' actions and plans, and suppliers' actions and plans. The data mining feature elicits the best ways to target new customers, the Integrated Management Tool comes up with the integrated profit-optimizing operation plan to reach the new customers and serve all customers. The RE 100 or ARMS 200 boasts rich modeling capabilities, which combine advanced analeptics, mathematical programming techniques, applied probability, simulation and neural network technologies to model complex business situations and compute optimal decisions. Mathematical programming, a branch of operations research, is used to determine what actions or what combination of actions will lead to a desired outcome. With an open architecture, the RE 100 or ARMS 200 leverages existing investments in data, analytical models, data warehousing and mining tools, and custom segmentation schemes.

In particular, the integral management feature supports a strategic optimization, looking at long-term behavior, not just how to optimize the next promotion, but how to optimize a long-term series of decisions, services and or packages of services for each customer/client. Traditional optimization did not involve predictive modeling. Instead, it relied on linear programming techniques. Typically, analysts knew the values of all variables and it was just a matter of finding the most efficient way to allocate resources for outsourcing. The integral management feature has a modeling component that provides a forecasting capability to its optimization and simulation tools.

Such an integral management feature of the RE 100 can be remotely accessed by a buyer or SP, or installed independently at the SP's computer and or with the automatic retaining management system ("ARMS") 200. In other words, ARMS is a system working exclusively for an SP or a buyer, which can be installed independently from the RE but working in conjunction with the RE. As such, the RE works as a neutral third party to any transaction without concerns of conflict of interest. Technologically, a ARMS can reside in the server which supports the RE.

Optimization has moved from a purely academic exercise to one that is applied effectively in the commercial world. However, the more complex the problem, the more flexible the solution must be. Only by incorporating the five processes discussed above, can decision-makers confidently reach the most reasoned, and reliable solutions. The RE 100 or ARMS 200 permits SPs to incorporate real-world business constraints and policy parameters and goals, enabling organizations to proactively and precisely make optimal strategic decisions and to maximize financial returns with certainty and confidence.

Before optimization can be conducted, the representations of the interactive environment, or models, have to be built. Predictive modeling uses raw data or data resulting from data mining to describe the process of mathematically or mentally representing a phenomenon or occurrence with a series of equations or relationships. These models are composed of inputs, such as age, income, and transactional history, and outputs, such as profitability, life-time value, or churn. There are many types of artificial intelligence and statistical techniques that can be used to engage in predictive modeling or data mining. For example, there are several methods including, but not limited to neural networks, decision trees, CHAID, CART, fuzzy logic, chaos theory, and other more traditional statistical methods, such as linear regression. The RE 100 or ARMS 200 decides which types of predictive models to utilize in varying situations.

The RE 100 or ARMS 200 enables and facilitates a buyer or SP to systematically applies judgment to the entire decision-making process regarding what services to offer at what costs at when and to whom. The RE 100 or ARMS 200 determines cause and effect from multi-source data to facilitate the decision-making process. In the value chain that spans from raw data to actionable information, towards analytical solutions. These solutions produce the greatest returns and routinely turn gigabytes of data into meaningful decision points and marketing plans to provide service(s) and/or packages of services. After determining the timewise price elasticity of one's portfolio of customers and potential competition, the RE 100 or ARMS 200 simulates the clients' response to a new service package during an aggregated life cycle of the clients to decide the best launching time and shelf life of the service package so as to obtain the optimized profit for the service package. The RE 100 or ARMS 200 further performs cross-service simulation to see the impact of the new service package on other existing services or service packages so as to modify the best launching time and shelf life of the service package thereby obtaining the optimized profit for all services and service packages over the aggregated life cycle of the clients.

The optimizing technology simulates "what-if" and goal-seeking optimization scenarios, which help decision-makers understand the consequences of various business strategies and the possibilities of outsourcing or completing the services or packages of services locally or in specific geographical locations or "in-house". The integral management feature enables SPs not only to gain much greater insight into the relationships within their databases, but also to gain these results in a fraction of the time or in three to six days which has traditionally taken six weeks to six months to generate. The predictive optimization solutions enable clients and service providers to achieve the maximum value from each individual customer and/or service provider or combination of service providers. The RE 100 or ARMS 200 predicts, tests, tracks, and optimizes strategic and tactical goals based on a complete and integrated view of revenue, risk and costs. The RE 100 or ARMS 200 also generates reports overviewing all variables of all transactions so that a buyer or an SP adjust accordingly. Data will be pulled from multiple areas within the system and integrated into one easy-to-read report.

The results are descriptive rather than prescriptive. The RE 100 or ARMS 200 predicts the best champion or any interaction effects of changing variables. The complexity of prescribing multiple decision variable changes for multiple segments can become impossible in such a system. However, it is a valuable framework for relationship mapping and forming the basis for subsequent analytic steps of optimization. It also identifies the importance of the various decision variables for a manager to focus. The decision variables are the model parameters or coefficients to be adjusted to achieve a good fit.

The RE 100 or ARMS 200 designs a solution for integrating functions and building value through a comprehensive optimization metric which incorporates uncertainty. Once a metric has been established and stored in the system, variables that are introduced at a later time can be added against the set of already pre-existing variables, and rather than trying to refigure each individual previous variable, they can be grouped and optimized and or simulated.

The integral management feature has the capabilities in prediction, simulation and optimization platform that incorporate real-world business constraints and policy parameters to provide recommendations for maximum economic returns for each customer/client over their entire portfolio. The solution combines the simulation and optimization technologies with its data mining prediction and forecasting capabilities. With the neural network-based predictive modeling and data mining tool, it is the ultimate retaining engine for outsourcing and retaining services and or packages of services from all service providers. Two types of constraints reflecting the real world, record-level constraints and cross-record constraints, will be provided to the RE 100 or ARMS 200. One may suppose a manager must optimize under policies that prevent long-term customers from receiving either increases or decreases in costs per service or package of services. These are local, or record-level, constraints since they apply one customer (or record) at a time. There may also be a constraint limiting the total expected losses due to default in the next year, i.e., a cross-record constraint since the actions (the values of the decision variables) on all accounts (records) must be considered at once in order to check compliance with this constraint.

Each optimization problem has an objective function—the expression of the metric it optimizes. The objective function is customizable to the individual business. Lifetime Consumption Value of Services (LCVS) is one measure that reflects the complete consumption of specific services of the business by a customer, a customer segment or all aggregated customers, considering all economic flows. Existing market research and forecast methods implemented on a weather forecast supercomputer can logically forecast the consumption of specific services provided by the business in a continuous and dynamic manner. Multiple consumption attributes (color, price, timing) within the complex mathematical expression of LCVS leads to a big optimization metric. Both of the aggregated life consumption and the price elasticity are expressed in functions of time and client segments with weighting. Client segmentation categories clients into different behavioral group with respect to LCVS. Each client segment is defined by income, balance, risk, preference or a combination of these consumption attributes. The relevant explanatory and tracking formula are mathematically constructed as a series of component cash flows over time but in present-value dollars.

SPs gain strategic advantage by fully understanding causal relationships, integrating cross-departmental goals, defining a company-wide and comprehensive performance measurement, incorporating real-world constraints, and exploring the tradeoffs between various strategic decisions. As shown in the following case study, the relationships between decision variables and customer behaviors influence multiple components of LCVS. Therefore, these individual variables must be broken down and represented to decision-makers in the most intuitive manner possible. A LCVS statement representing LCVS cash flow components to key executives reflecting the impact of their decisions on revenues and expenses, near term and over an extended time period.

The formulas can be modified to incorporate weighted combination of the different objectives (where the weights represent their relative importance), or by representing some of the objectives as constraints, whenever those objectives must attain known desired values.

A cash flow calculator (CFC) accurately measures all the cash inflows and outflows demanded by the objective function and constraints. The cash flow calculator can calculate inflows and outflows from model predictions and forecasts of account behavior as well as from other data available to the decision-maker, converting all available data into a series of detailed and customizable cash flows at time series intervals specified by the client (monthly, quarterly, bi-annually or annually). Cash inflows and outflows also facilitate the calculation of "terminal value." Individual cash flows calculated at the most granular or detailed level with respect to the different individual components that comprise all flows of cash—can be discounted and ultimately form the expression that is the objective function of the optimization analysis. The cash flow calculator easily and systematically calculates and reports, or combines them into LCVS.

The RE 100 or ARMS 200 also executes per-scheduled purchases for a participant according to a set of pre-set preferences or criteria. For example, one buyer may order the RE, an agent, or a vendor, such as an on-line casino, to automatically and systematically purchase the lottery tickets according to pre-set preferences or criteria, such as types of lotteries, search criteria, pay-offs, numbers and dates etc. Besides executing the purchase/retaining according the buyer's instruction, such as the same set of number 10, 4 every week for one year or three months in certain city or certain area codes, the RE 100 or ARMS 200 of the marketplace or a vendor can also forecasts the probability of winning according to the historical winning numbers with respect to each location. Beyond that, the buyer can simulate other purchasing scenarios to optimize the chances of winning. In particular, the RE 100 or ARMS 200 targets on the optimized accumulated awards over a period of time rather than one time. Alternatively, the vendor solicits on-line for a retaining group so as to pool their money together to participate in the lottery in a matter but not limited to as described above.

When the RE 100 or ARMS 200 identify an RFO for an SP, it first evaluates the RFO to decide whether its inventory and existing resources can carry out the RFO or whether it needs to invest additionally to fulfill the RFO. Once it submits a responsive offer to the buyer by a deadline, and is subsequently informed of the buyer's acceptance, the offer becomes binding, and the RE 100 or ARMS 200 will rearrange the operational schedule and inventory of the SP accordingly.

The RE 100 or ARMS 200 permits affiliated SPs to dispose of extra service capability and fill slow times and thereby obtain value from such unwanted services and slow periods. For example, when a service(s) and or package(s) of services is first added to an SP's schedule, the SP's automatic retaining management system attempts to maximize revenue for the service by establishing a plurality of fees/rates and then allocating the number of services and fees assigned to each service(s) or packages of services. The automatic retaining management system will thereafter continue to monitor the actual demand within each service(s) or packages of services relative to forecasted demand, and based on geographical location and the available service(s) and or packages of services to dynamically reevaluate the availability of service(s) and or packages of services allocation and pricing of each service(s) or packages of services for a given service(s) or packages of services also considering and specific requirements that may be specified by the user(s) or the SP(s). In this manner, the SPs attempt to schedule each service(s) and or packages of services and keep their schedules as full as possible without allowing earlier scheduling and retaining of discounted-fees to displace later-booking fall-fee clients.

Case Study: One pharmaceutical company has a strong product promoted by two of its sales forces. Although sales met corporate expectations, the company's product management team feel there is room for improvement. The management looks for new ways to increase their profitability and ROI, outside of the existing promotional activities, such as sampling, dinner meetings, direct mail, and teleconferences. The RE 100 develops a promotional predictive model with the pharmaceutical company's prescription data and internal promotion and sales activity for the last six months. Using the optimization solution, the RE 100 simulates the real world effect of various promotional plans before assigning one to their sales team. The promotional response analysis revealed that each of the six different new services has substantially different effects on physician prescribing behavior. Surprisingly, only two new services have significant positive impacts on prescription behavior for each of the 100,000 physicians in the database. The RE 100 further simulates how much profitability could be increased if the two new services are launched within the company's operational constraints. For example, no physician could receive more than 500 samples in a six-month period. The RE 100 adjusts all levels of marketing activity under the company's control until an optimal solution is found. A tailored marketing and promotional mix is recommended for each physician to maximize profit from all the physicians for, as an example, the future 10 years (the predicted life cycle of the new services). A summary table provides more detail on the plan chosen for implementation, including sales, total profits, profits due to additional investment, and ROI. The RE 100 also discovers that, by simply changing the physician-sampling strategy, the predicted sales increases by $1.4 million.

After a new service(s) and or package(s) of services is added to the company's schedule, the RE 100 continues monitoring the actual sales relative to forecasted demand, and based on geographical location and the available service(s) to reevaluate the availability of service(s) allocation and pricing. Accordingly, the company schedules each service(s) appropriately to keep the schedules as full as possible, and tries to avoid the cost of last-minute cancellation or discounted fees due to early scheduling.

Speech, Language, Emotion, Intelligence, Character & Characteristics Recognition 170

Speech recognition by voice (acoustic) or by facial expression/facial muscle movement (visual) has been applied to help the blind in recognizing the content of the speech. The recognition is improved when combining the acoustical source with an optical source that contains information from the facial region such as gestures, expressions, head-position, eyebrows, eyes, ears, mouth, teeth, tongue, cheeks, jaw, neck, and hair. The major models for speech recognition (visual) include Hidden Markov Models, Multi-Layer Perception, etc. which is enabled by analyzing image sequences. Experts combine the acoustic and visual analysis since human speech production and facial expression are inherently linked by a synchrony phenomenon, where changes often occur simultaneously with speech and facial movements. For example, an eye blink movement may occur at the beginning or end of a word, while oral-cavity movements may cease at the end of a sentence.

The RE 100 not only combines the acoustical source with an visual source that contains information from the facial regions but also processes the data via data mining 150 so as to analyze the speech 171, emotion 173 (anger, surprise), truthfulness, temperament (hostility), and personality (shyness) of a participant of the service marketplace. Specifically, the RE 100 data-mines the collected acoustic and visual data to develop a set of behavior or body language algorithms to identify the speaker's emotion (psychiatry, psychological) and social intelligence in conjunction with the content of the speech. The acoustic and visual data of a speaker are measured, sensed, then transferred to a database to be filtered and translated to patterns via optimizing queries, on-line lie detecting, graph systems, semi structured data, simulation, query answering algorithms, etc. As such, the RE 100 combines, classifies, and analyzes acoustic and visual data to deepen understanding of the sample behaviors so as to discover the implications to the speaker's cognitive, ethical, educational, legal, and social intelligence and to collaborate in sharing this knowledge and working together interactively. With such a data mining approach, the RE 100 accumulates a person's emotional and social history that can be related to and dispense that particular person's social intelligence.

The analysis of social intelligence 174 includes identifying, investigating, and modeling the ways natural and artificial systems operate in order to arrive at unifying principles that explain (1) how learning and intelligent behavior occur in humans, in other natural systems, and in artificial systems; (2) the types of learning tasks and decision making that are best suited; (3) the kinds of information and decisions each characteristic produces or creates; (4) the impact of interactions among alternative interactive learning environments, social contexts and experiences. With a comprehensive set of learning and research tools, methods and technologies that use biological, behavioral, cognitive, linguistic, social, and educational concepts with interactive, collaborative, and multi-sensory technologies, the RE 100 develops fundamental knowledge concerning the nature of learning and intelligence in natural or artificial systems, and to apply such knowledge in speech 171, language 172, emotion 173, social intelligence 174, character and characteristics 175 recognition.

For analyzing the social intelligence of a participant, the RE 100 use at least one factor for intelligence, i.e., IQ tests, which are conducted through inputs of the user and or through sensors connected with equipment including age definition meaning by touch and size of fingertips so as to analyze the user of age six by the information the user enters while surfing the web, such as the accuracy of spelling, words, topics, interests, mathematical inputs, etc., to determine a valued IQ of the user. Intelligence and intelligence testing focuses on the question of whether it is useful or meaningful to evaluate people according to a single major dimension of cognitive competence. There is indeed a general mental ability we commonly call "intelligence," and it is important in the practical affairs of life. Regardless the form or content, tests of mental skills invariably point to the existence of a global factor that permeates all aspects of cognition. And this factor seems to have considerable influence on a person's practical quality of life. Intelligence as measured by IQ tests is the single most effective predictor known of individual performance at school and on the job. It also predicts many other aspects of well-being, including a person's chances of divorcing, dropping out of high school, being unemployed or having illegitimate children. The RE 100 then determines the on-line user social intelligence. The information on social intelligence can be used for promoting dynamic task allocation, interaction, coordination, process and organization representation, collective learning, consistency business management, protocol, and negotiation.

By the same approach as with the emotion recognition 173, the RE 100 also tracks a speaker's character and characteristics 175 over time by analyzing a sequence of images with a sets of characteristic algorithms then saves the images into a imagery database.

In one embodiment of the present invention, the sensors are programmed to function automatically under certain emergent circumstance. For example, a 50-year-old man has his cell phone in his pocket with a built-in sensor. When the man has a heart attack, the cell phone senses the pulse change and automatically calls 911 for emergency services. The same technique can be applied to babies and the elderly, and hikers and other physical fitness/sports enthusiasts.

The RE 100 solves problems by searching, game playing, logical reasoning in conjunction with the results from speech, language, emotion, social intelligence, character and characteristics recognition. The analysis results may be forwarded to a third party, such as an attorney, an expert or a mediator, for facilitating the negotiation.

In addition, the emotion is recognized real-time base and with means beyond the traditional ones. For example, the RE 100 uses sensors to catch smells, touch, taste, pulse, body temperature, body language, heart beats, etc. of a participant or an object to decide whether the participant is lying. These sensors include equipment and/or many devices such as neuron technology built into the chips, fiber-optic or lasers sensor.

In another embodiment of the present invention, the sensors are remotely controlled to conduct tele-medicine, joint lab research projects, etc. For example, one oncologist processes cell classification and taxonomy analysis by controlling the sensor on a patient. As another example, three scientists working on the same prototype of a special material by sensing the temperature and characteristics of the material.

The recognition information is to be used for collaborative knowledge construction, developing representation and filtering tools, digital libraries and repositories across disciplines and application domains, translation of representations, building domain-specific, multidisciplinary knowledge networks and co-laboratories. The recognition information can also be used to determine a customer's lifetime consumption value of services (LCVS) as discussed previously.

The RE 100 applies a similar technique for language recognition 172, reference languages and patterns of good quality are generated from the holographic database over a computerized network or satellite system. Continuous language patterns and reference language patterns are efficiently compressed so users can pick and choose the language preferences and or that can be converted to be used in the holographic imagery preferences in the database. The compressed continuous language patterns are sequentially and directly matched with the compressed reference language patterns to recognize the language at high speed and with high precision.

A reference pattern-generating unit generates a reference language pattern by normalizing sample patterns while taking into consideration their non-linear compression/expansion and by calculating an average of the sample patterns into the two-dimensional, three-dimensional, six-dimensional, or holographic imagery database system. A continuous language recognition unit recognizes a continuous language at high speed by sequentially matching the continuous language of time sequential patterns with reference language patterns while allowing non-linear expansion and compression in the time domain.

A language translation system is provided in which a language as well as the facial expression, movement or emotion of a language user is recognized and converted into a holographic image and with, but not limited to, a spoken language with emotion and movement and transferred in the form of holographic imagery texts, voices, sign languages of another type to a particular partner among a plurality of unknown holographic and/or system users.

Figure 5:
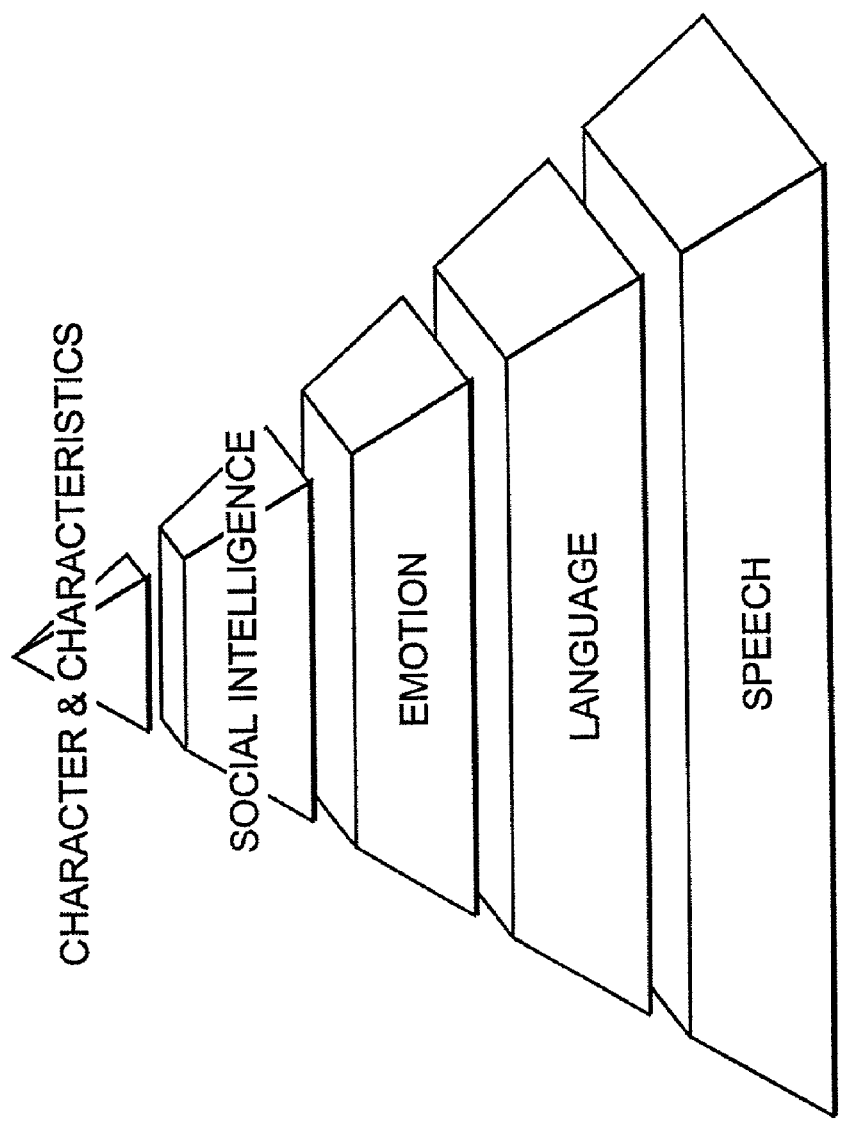
FIG. 5 shows the layers of data mined by the Retaining Engine compiled from speech recognition to language recognition and other layers subsequently according to one embodiment of the present invention.

FIG. 5 shows the layers of data mined by the Retaining Engine 110 compiled from speech recognition to language recognition and other layers subsequently according to one embodiment of the present invention. The sequence may be altered for specific data mining inquiries incorporation with a particular data mining method or model.

The RE 100 provides descriptions of the characteristics and motions between but not limited to two holographic image frames and databases. These descriptions of characteristics and motions are further analyzed by the RE 100 to recognize the aforementioned characteristics, movement, expression etc. The RE 100 analyzes characteristics and motions between but not limited to two images using but not limited to parameterized models of image characteristics and motions. The RE 100 defines segmented regions so as to track the pan and tilt of facial muscles and changes of skin tones to decide the curvature of the facial expression of a speaker. Initially, a first image in a sequence of images is segmented into a region and a plurality of regions. Then it is used to recover characteristics and motion parameters that estimate characteristics and motion between the segmented region in the first image and a second image in the sequence of images. The second image is warped or shifted back towards the first image using the estimated characteristics and motion parameters of the model, in order to model the characteristics and motions relative to the first image. A first model and a second model with curvature are used to recover characteristics and motion parameters that estimate the image characteristics and motion between the segmented characteristics and motions and within the regions and the second image. The recovered characteristics and motion parameters of the regions represent the relative characteristics and motions of the features between the first image and the second image. The region in the second image is tracked using the recovered characteristics and motion parameters of the region. The regions in the second image are tracked using both the recovered characteristics and motion parameters for the region and the characteristics and motion parameters for the regions. The parameters describing the characteristics and motion of the features are filtered to derive mid-level predicates that define body gestures occurring between the two images. These mid-level predicates are evaluated over time to determine but not limited to the above-mentioned characteristics and expression and gestures occurring in the image sequence.

In addition to generate a holographic image 101 representing the RE 100, i.e., a Retaining Agent 101, the RE 100 also generates holographic images of a buyer or an SP to be displayed to another buyer or SP whether the RE 100 is conducting a speech, language, emotion, social intelligence or characteristics recognition of either speaker.

In another embodiment of the present invention, the speaker may use an image different from the speaker's actual appearance so as to disguise the speaker's actual identity. As such, the RE 100 will create a mirror image of the speaker's emotions, social intelligence or characteristics. Whenever the reaction of the holographic image does not match with the speaker's, the RE 100 will adjust the emotion generation algorithms and body language algorithms.

Business Service Referral 180

The RE 100 provides referrals regarding services and/or packages of services as required by a participant. In association with each SP and such services, the service or package of services includes a hyper textual "referral link" that allows a user ("customer") to link to colleagues, friends and family the SP's site and/or services or package of services and retain the service. When a customer selects a referral link, the customer's computer transmits unique IDs of the selected service or package of services and of the SP's site, allowing the SP to identify the service and the referring user. If the customer subsequently retains the services or package of services from the SP's site, the RE 100 automatically credits an account of the referring individual. In another embodiment of the present invention, when that individual's credited account reaches a limit, then that individual qualifies for free services or packages of services from the SP.

Other Functions 90

The charity feature supported by the RE 100 allows SP's to donate free services to those in need locally or worldwide. The charity feature allows a charity request for donations to be processed as a request for offers but with less restrict registration procedure for donors and recipients than the participant of the service marketplace. Charities often hold fund raising auctions in which they sell valuable items not services and or packages of services, which have been donated to the charity. The retaining auction method presented allows services and/or packages of services to be retained and increases the amount of funds a charity raises in these auctions for two reasons. First, it greatly increases the number of participants by allowing easy on-line access to the retaining auction. Second, it increases the retainer by allowing ordinary individuals, in addition to wealthy individuals, to contribute to the total retainer, expanding the pool of available funds. In one possible embodiment, competitive retaining groups are formed, each retaining group representing a different charitable cause. Each IRA or retainer contributed to a retaining group helps the respective charity, but only the winning group is awarded the service(s) and or package of services being auctioned and retained. The winning group then holds a lottery to determine which one of the contributing registered users gets to keep or distribute the service(s) and/or package of services.

The RE 100 actively promotes or markets services for any participants, especially those in countries without sufficient internet infrastructure. The RE 100 may take or share risk as well as commissions for such activities based on agreements.

The RE 100 organizes e-mail or notification campaigns for a participant. The registered participants receive advanced notice promoting the upcoming services, such as guest speakers' availability, and the exclusive silent/private auction. Email newsletters are generated to meet users' specific needs and requests. In addition, the RE 100 also auctions the Guest Speakers services for the retaining of the guest speakers on a certain available date and location, and then schedules that guest speaker at the time of retaining. Further more, The Re 100 supports employment matching whether it is oriented by an employer, an job-seeker, or a head-hunter.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A computer-implemented method for facilitating a services marketplace between multiple buyers and sellers of services, comprising:
    defining a set of service classification and material terms;
    registering a plurality of participants of the service marketplace;
    compiling offers to sell services and requests to buy services provided by said participants, wherein the offers and the requests are described in said set of service classification and material terms;
    automatically evaluating and matching the offers and the requests, without human intervention, based upon the degree of identicalness of said set of service classification and material terms recited in the offers and the requests;
    communicating to matched participants of the result generated by the evaluating and matching step;
    the offers being unknown to service buyers and requests being unknown to service sellers prior to the communicating step; and
    recognizing at least one of speech, language, emotion, social intelligent, character and characteristics of at least one of the participants by analyzing acoustic or imagery signals collated with the at least one of the participants.

2. A computer-implemented method for facilitating a services marketplace according to claim 1, further comprising a step of making the offer and the request accessible for consideration by the participants.

3. A computer-implemented method for facilitating a services marketplace according to claim 1, further comprising a step of settling a transaction based upon said set of service classification and material terms recited in the matched offer and the matched request.

4. A computer-implemented method for facilitating a services marketplace according to claim 1, further comprising a step of arbitrating a dispute regarding said set of service classification and material terms recited in the matched offer and the matched request.

5. A computer-implemented method for facilitating a services marketplace according to claim 3, further comprising a step of assisting the matched participants to fulfill the transaction based upon said set of service classification and material terms recited in the matched offer and the matched request.

6. A computer-implemented method for facilitating a services marketplace according to claim 1, wherein the searching and compiling step includes organizing at least one of retaining session, off-retaining session, accumulating session, and double session.

7. A computer-implemented method for facilitating a services marketplace according to claim 1, further comprising a step of data-mining the offers and the requests to discover at least one transactional attribute of one, a portion, or all of the participants.

8. A computer-implemented method for facilitating a services marketplace according to claim 7, further comprising a step of simulating the marketplace based upon the results of the data-mining step and operational constrains of one of said participants, wherein the operational constrains comprises assets, cash, capital, inventory, labor, staff, debt, liability, intellectual property, customer preference, competitors' actions and plans, suppliers' actions and plans so as to determine an optimized business action or plan from an integrated and long term perspective.

9. A computer-implemented method for facilitating a services marketplace according to claim 7, further comprising a step of recognizing at least one of speech, language, emotion, social intelligent, character and characteristics of at least one of the participants by analyzing acoustic or imagery signals collates with the at least one of the participants in conjunction with the at least one transactional attribute of one, a portion, or all of the participants.

10. A computer-implemented method for facilitating a services marketplace according to claim 1, further comprising a step of referring business among the participants based upon the results of the registration step or the offers and requests.

11. A computer-implemented method for facilitating a services marketplace according to claim 1, wherein the registering step further including registering at least one charity and one donor, wherein the offers and requests include at least one offer to donate services and one request for donating services.

12. A computer-implemented method for facilitating a services marketplace according to claim 1, wherein some of the participants are in locations without sufficient internet infrastructure.

13. A computer-implemented method for facilitating a services marketplace according to claim 1, further comprising providing a retaining agent to execute all steps in the method, wherein the retaining agent is equipped with artificial intelligence.

14. A computer-implemented method for facilitating a services marketplace according to claim 1, further comprising a step of taking or sharing risk with at least one of the participants.

15. A computer-implemented method for facilitating a services marketplace according to claim 1, further comprising a step of collecting fees or commission at least one of the participants for executing any one of the other steps in the method.

16. A computer-implemented method for facilitating a services marketplace according to claim 1, further comprising a step of promoting at least one of the offer and the request of at least one of the participants.

17. A computer-implemented method for facilitating a services marketplace according to claim 3, wherein the settling step including forwarding payment via a mode selected from the group consisting of credit card information, debit card information, electronic cash information, billing, invoicing, bartering or other non-monetary consideration, and combinations thereof.

18. A computer-implemented method for facilitating a services marketplace according to claim 1, further comprising a step of gap-filling any unspecific material terms in the offers and requests with a set of default terms or gap-fillers.

19. A computer-implemented method for facilitating a services marketplace according to claim 7, further comprising a step of predicting behavior of the participants or market based on the result generated by the data-mining step, a set of predetermined operational constrains of one participant, and casual relationships and sensitivities among the factors.

20. A computer-implemented method for facilitating a services marketplace according to claim 19, further comprising a step of optimizing profits of the participant based on the result generated by the predicting step.

21. A computer-implemented method for facilitating a services marketplace according to claim 1, whereby biometrics detect and analyze body language or pulse, temperature of the participant so as to recognize the emotion, social intelligence, character or characteristics of the participant.

22. A computer-implemented method for facilitating a services marketplace according to claim 1, wherein the matched offer and the matched request automatically becomes binding as soon as the result generated by the evaluating and matching step is sent or communicated to the matched participants according to said set of material terms recited in the matched offer and matched request.

23. A computer-implemented method for facilitating a services marketplace according to claim 1, wherein the matched offer and the matched request are still open according to said set of material terms recited in the matched offer and matched request, and the matched participants may elect to continue or stop negotiating.

24. A computer-implemented method for facilitating a services marketplace according to claim 1, wherein a participant limits other participants from submitting multiple offers of requests to probe for undisclosed material terms in said set of material terms recited in the at least one offer and one request.

25. A computer-implemented method for facilitating a services marketplace according to claim 1, further comprising a step of authenticating credit of the participants or the matched participants.

26. A computer-implemented method for facilitating a services marketplace according to claim 1, further comprising a step of authenticating one or more selected material terms recited in the offer and the request.

27. A computer-implemented method for facilitating a services marketplace according to claim 1, further comprising a step of hosting a site or a web site accessible to the participants for posting or browsing the offers and requests.

28. A computer-implemented method for facilitating a services marketplace according to claim 2, further comprising a step of screening access of the participants according to a screening criteria recited in the offers and requests.

29. A computer-implemented method for facilitating a services marketplace according to claim 6, further comprising a step of screening access of the participants to the sessions according to a screening criteria recited in the offers and requests.

30. A computer-implemented method for facilitating a services marketplace according to claim 1, wherein the material terms recited in the offer and the request are prioritized or weighted, and the evaluating and matching step including a step of establishing a hierarchy of offers or requests based on the prioritized or weighted material terms.

31. A computer-implemented method for facilitating a services marketplace according to claim 27, further comprising a step of representing at least one of the participants or the retaining agent in an actual or artificial two dimensional, three-dimensional, or holographic image.

32. A computer-implemented method for facilitating a services marketplace according to claim 1, wherein the services include service packages each of which contains two or more complementary or co-branding services.

33. A computer-implemented method for facilitating a services marketplace according to claim 1, wherein said material terms are established by trade associations or professional associations.

34. A computer-implemented method for facilitating a services marketplace according to claim 23, wherein the negotiation is continued by sending counter offers.

35. A computer-implemented method for creating a services marketplace according to claim 6, whereby offers or requests are incrementally pooled into one collective retainer and a retaining group is form at the end of the accumulating session.

36. A computer-implemented method for creating a services marketplace according to claim 35, wherein said retaining group includes members at different geographic locations.

37. A computer-implemented method for creating a services marketplace according to claim 35, wherein the members are affiliated via at least one of affiliated entities, agents, brokers, distributors, franchises, other cooperative relationships, associations, other types of non-profit organizations.

38. A computer-implemented method for creating a services marketplace according to claim 35, wherein the members are non-related but for selling or buying said services.

39. A computer-implemented method for creating a services marketplace according to claim 1, wherein the offers and requests are accepted, conditionally accepted, rejected or countered based upon the result generated by the evaluating and matching step.

40. A computer-implemented method for facilitating a services marketplace according to claim 1, further comprising a step of representing at least one of the participants or the retaining agent in a two-dimensional, three-dimensional, or holographic image according to spoken or written commands of the at least of the participants based on the result generated by the recognizing step.

41. A computer-implemented method for facilitating a services marketplace according to claim 1, whereby the imagery signals of the participant is taken to compute features of the participant including lip separation, lip shape and intrusion depth parameters, so as to characterize and discriminate spoken phonemes of the participant.

42. A computer-implemented method for facilitating a services marketplace according to claim 41, whereby said spoken phonemes of the participant is normalized to be compared with reference languages so to identify the language used by the participant.

43. A computer-implemented method for facilitating a services marketplace according to claim 42, whereby the identified language is translated into another language in texts, voice or sight language.

44. A computer-implemented method for facilitating a services marketplace according to claim 43, whereby said voice or sight language is represented in an actual or artificial two-dimensional, three-dimensional, or holographic figure of the participant.

45. A computer-implemented method for facilitating a services marketplace according to claim 7, wherein the at least one transactional attribute include consumption profiles, habits and preferences.

46. A computer-implemented method for facilitating a services marketplace according to claim 4, whereby said body language-analyzing step includes:
   taking a plurality of sequential actual images of the speaker;
   extracting data on predetermined regions or features of the speaker from said plurality of sequential actual images;
   comparing said data of every two of said sequential actual images to generate predicated images of the predetermined regions or features of the speaker with at least one facial expression algorithm;
   further comparing the predicated images with the predetermined regions or features and the actual images taken and extracted immediately after said every two of said sequential actual images;
   modifying said facial expression algorithm according to the comparing result of the predicted images and said actual images.

47. A computer-implemented method for facilitating a services marketplace according to claim 46, wherein the further comparing step is triggered only if the comparing step decides that the speaker demonstrated a negative emotion including anger, sadness, and fear.

48. A computer-implemented method for facilitating a services marketplace according to claim 1 further comprising a step of balancing the load of a cluster of computers that function together as a single entity for executing the method.

49. A computer-implemented method for facilitating a services marketplace according to claim 1 further comprising a step of assigning at least one of the participants an identification number so as to keep the participant anonymous.

50. A computer-implemented method for facilitating a services marketplace according to claim 1 further comprising a step of translating the offers and requests into a predetermined computer language or format.

51. A computer-implemented method for facilitating a services marketplace according to claim 10 further comprising rewarding a referrer which makes the referral.

52. A computer-implemented method for creating a services marketplace according to claim 1, wherein the material terms include at least one of geographic restrictions which include labor, unions, professional licenses, local contains requirements, heavy equipment or materials, or unique characteristics of products originated from a specific geographic location.

53. A computer-implemented method for creating a services marketplace according to claim 1 further comprising a step of executing at least one per scheduled purchase for at least one of the participants according to a set of pre-set preferences or criteria.

54. A computer-implemented method for creating a services marketplace according to claim 53, wherein the at least one of the participants orders an agent to automatically and systematically purchase lottery tickets according to criteria of types of lotteries, numbers and dates.

55. A computer-implemented method for creating a services marketplace according to claim 1 further comprising a step of auctioning and scheduling guest speakers services for guest speakers.

56. A computer-implemented method for creating a services marketplace according to claim 1 further comprising a step of matching employment opportunities initiated by an employer, a job-seeker, or a head-hunter.

57. A computer-implemented method for creating a services marketplace according to claim 1 further comprising an alternative evaluating and matching step in case that two or more offers or requests having a same degree of identicalness of said set of service classification and material terms recited in the offer and the request.

58. A computer-implemented method for facilitating a services marketplace according to claim 27, further comprising encrypting all communication among the participants or between the participants and the site or the website.

* * * * *